United States Patent
Hegde et al.

(10) Patent No.: US 9,838,246 B1
(45) Date of Patent: Dec. 5, 2017

(54) MICRO-LOOP PREVENTION USING SOURCE PACKET ROUTING

(71) Applicant: Juniper Networks, Inc., Sunnyvale, CA (US)

(72) Inventors: Shraddha Hegde, Bangalore (IN); Pushpasis Sarkar, Bangalore (IN); Hannes Gredler, Pillberg (AT)

(73) Assignee: Juniper Networks, Inc., Sunnyvale, CA (US)

( * ) Notice: Subject to any disclaimer, the term of this patent is extended or adjusted under 35 U.S.C. 154(b) by 180 days.

(21) Appl. No.: 14/502,469

(22) Filed: Sep. 30, 2014

(51) Int. Cl.
  *H04L 12/721* (2013.01)
  *H04L 12/24* (2006.01)
  *H04L 12/723* (2013.01)
  *H04L 12/705* (2013.01)

(52) U.S. Cl.
  CPC ...... *H04L 41/0668* (2013.01); *H04L 41/0816* (2013.01); *H04L 41/12* (2013.01); *H04L 45/18* (2013.01); *H04L 45/507* (2013.01); *H04L 45/72* (2013.01)

(58) Field of Classification Search
  CPC ... H04L 41/0668; H04L 45/507; H04L 45/72; H04L 41/12; H04L 45/18; H04L 41/0816; H04L 45/34; H04L 69/40; H04L 45/22; H04L 45/28; H04L 2012/5627
  USPC .................................................. 370/216–228
  See application file for complete search history.

(56) References Cited

U.S. PATENT DOCUMENTS

| | | | |
|---|---|---|---|
| 7,046,565 B1 | 5/2006 | Barth, Jr. et al. | |
| 7,184,437 B1 | 2/2007 | Cole et al. | |
| 7,466,703 B1 | 12/2008 | Arunachalam et al. | |
| 7,483,387 B2 | 1/2009 | Guichard et al. | |
| 7,564,803 B1 | 7/2009 | Minei et al. | |

(Continued)

FOREIGN PATENT DOCUMENTS

| | | |
|---|---|---|
| EP | 2663040 A1 | 11/2013 |
| WO | 2013184846 A1 | 12/2013 |

OTHER PUBLICATIONS

Aggarwal, et al., "MPLS Upstream Label Assignment and Context-Specific Label Space," IETF Trust, Aug. 2008, 14 pp.

(Continued)

*Primary Examiner* — Edan Orgad
*Assistant Examiner* — Ivan O Latorre
(74) *Attorney, Agent, or Firm* — Shumaker & Sieffert, P.A.

(57) ABSTRACT

In general, techniques are described for reducing or otherwise preventing micro-loops in network using Source Packet Routing in Networking (SPRING). In some examples, a method includes detecting a failure of a communication by a network device that implements a Source Packet Routing in Networking (SPRING) protocol to forward network packets using node labels according to an initial network topology. Responsive to detecting the failure of the communication link, the network device may apply, for a defined time duration, one or more adjacency labels to network packets to define a set of one-hop tunnels corresponding to a backup sub-path that circumvents the failed communication link. Upon expiration of the defined time duration, the network device may forward, according to a new network topology that is not based on applying the one or more adjacency labels that define the set of one-hop tunnels, network packets destined for the destination network device.

20 Claims, 9 Drawing Sheets

(56) References Cited

U.S. PATENT DOCUMENTS

| | | | |
|---|---|---|---|
| 7,864,706 B1 | 1/2011 | Zinjuwadia et al. | |
| 7,889,711 B1 | 2/2011 | Minei et al. | |
| 7,929,557 B2 | 4/2011 | Kompella | |
| 7,948,986 B1 | 5/2011 | Ghosh et al. | |
| 8,050,559 B2 | 11/2011 | Sindhu | |
| 8,477,795 B2 | 7/2013 | Kini et al. | |
| 8,570,872 B2* | 10/2013 | Wiley | H04L 29/06027 370/235 |
| 8,724,629 B1 | 5/2014 | Goli et al. | |
| 8,804,494 B1 | 8/2014 | Uberoy | |
| 8,817,596 B2* | 8/2014 | Chen | H04L 45/00 370/221 |
| 8,861,340 B1 | 10/2014 | Atlas | |
| 8,891,553 B2 | 11/2014 | Guichard et al. | |
| 9,019,865 B2 | 4/2015 | Gredler et al. | |
| 9,049,098 B2 | 6/2015 | Guichard et al. | |
| 9,049,233 B2 | 6/2015 | Frost et al. | |
| 9,166,990 B2 | 10/2015 | Eswaran et al. | |
| 2002/0004843 A1* | 1/2002 | Andersson | H04L 45/00 709/238 |
| 2004/0039840 A1 | 2/2004 | Dispensa et al. | |
| 2005/0131912 A1 | 6/2005 | Lin et al. | |
| 2005/0195741 A1* | 9/2005 | Doshi | H04L 47/825 370/230 |
| 2006/0056328 A1 | 3/2006 | Lehane et al. | |
| 2006/0087965 A1* | 4/2006 | Shand | H04L 41/0663 370/218 |
| 2006/0159076 A1 | 7/2006 | Bless et al. | |
| 2006/0242690 A1 | 10/2006 | Wolf et al. | |
| 2007/0177523 A1* | 8/2007 | Nagami | H04L 12/2602 370/252 |
| 2007/0183317 A1* | 8/2007 | Vasseur | H04J 3/14 370/225 |
| 2007/0208874 A1 | 9/2007 | Previdi et al. | |
| 2007/0253416 A1* | 11/2007 | Raj | H04L 45/02 370/390 |
| 2008/0044181 A1 | 2/2008 | Sindhu | |
| 2008/0049751 A1 | 2/2008 | Venkat et al. | |
| 2009/0073996 A1 | 3/2009 | Swallow et al. | |
| 2009/0144443 A1 | 6/2009 | Vasseur et al. | |
| 2009/0182894 A1 | 7/2009 | Vasseur et al. | |
| 2009/0185484 A1 | 7/2009 | Bless et al. | |
| 2009/0252173 A1* | 10/2009 | Sampath | H04L 45/586 370/400 |
| 2010/0212005 A1 | 8/2010 | Eswaran et al. | |
| 2010/0271936 A1* | 10/2010 | Allan | H04L 12/462 370/225 |
| 2011/0019534 A1* | 1/2011 | Ramakrishnan | H04L 45/00 370/217 |
| 2011/0022728 A1 | 1/2011 | Kern et al. | |
| 2011/0235545 A1 | 9/2011 | Subramanian et al. | |
| 2011/0273980 A1* | 11/2011 | Ashwood Smith | H04L 45/00 370/225 |
| 2012/0020364 A1 | 1/2012 | Zinjuwadia et al. | |
| 2012/0033542 A1* | 2/2012 | Hanif | H04L 45/00 370/217 |
| 2012/0033663 A1 | 2/2012 | Guichard et al. | |
| 2012/0044811 A1* | 2/2012 | White | H04L 45/02 370/238 |
| 2012/0069745 A1 | 3/2012 | Kini et al. | |
| 2012/0224506 A1 | 9/2012 | Gredler et al. | |
| 2012/0239796 A1 | 9/2012 | Narasappa | |
| 2012/0287935 A1 | 11/2012 | Swallow et al. | |
| 2013/0089100 A1* | 4/2013 | Zhao | H04L 45/28 370/395.5 |
| 2013/0121339 A1 | 5/2013 | Dispensa et al. | |
| 2013/0336103 A1 | 12/2013 | Vasseur et al. | |
| 2013/0336191 A1* | 12/2013 | Zhao | H04L 12/1863 370/312 |
| 2014/0092738 A1* | 4/2014 | Grandhi | H04L 47/52 370/235 |
| 2014/0098675 A1 | 4/2014 | Frost et al. | |
| 2014/0126420 A1* | 5/2014 | Chiabaut | H04L 12/18 370/254 |
| 2014/0149782 A1 | 5/2014 | Lu et al. | |
| 2014/0149819 A1 | 5/2014 | Lu et al. | |
| 2014/0269266 A1* | 9/2014 | Filsfils | H04L 43/50 370/228 |
| 2015/0103844 A1* | 4/2015 | Zhao | H04L 45/42 370/410 |
| 2015/0131458 A1 | 5/2015 | Scharf et al. | |
| 2015/0180771 A1* | 6/2015 | Ashwood-Smith | H04L 45/72 370/230 |
| 2015/0304206 A1* | 10/2015 | Filsfils | H04L 45/04 709/238 |
| 2015/0326675 A1* | 11/2015 | Kini | H04L 67/16 709/224 |
| 2015/0350062 A1* | 12/2015 | Lindem, III | H04L 45/22 370/220 |
| 2015/0381406 A1* | 12/2015 | Francois | H04L 45/28 370/218 |

OTHER PUBLICATIONS

Anderson, "LDP Specification," Network Working Group, RFC 3036, Jan. 2001, 132 pp.

Anderson, "LDP Specification," Network Working Group, RFC 5036, Oct. 2007, 135 pp.

Asati, et al., "Label Distribution Protocal (LDP) 'Typed Wildcard' Forward Equivalence Class (FEC)," IETF Trust, Aug. 2010, 11 pp.

Atlas, et al., "Basic Specification for IP Fast Reroute: Loo-Free Alternates," IETF Trust, Sep. 2008, 32 pp.

Bryant et al., "IP Fast Reroute using tunnels draft-bryant-ipfrr-tunnels-03," IETF Trust, Nov. 16, 2007, 30 pp.

Bryant et al., "Remote LFA FRR draft-ietf-rtgwg-remote-lfa-01", IETF Trust, Dec. 19, 2012, 14 pp.

Callon, "Use of OSI IS-IS for Routing in TCP/IP and Dual Environments," Network Working Group, RFC 1195, Dec. 1990, 80 pp.

Filsfils, et al., "Segment Routing Architecture," draft-filsfils-spring-segment-routing-04, Network Working Group, Internet Draft, Jul. 3, 2014, 15 pp.

Filsfils, et al., "Segment Routing with MPLS data plane," draft-filsfils-spring-segment-routing-mpls-03, Network Working Group, Internet Draft, Jul. 31, 2014, 13 pp.

Filsfils et al., "Segment Routing Architecture," draft-filsfils-rtgwg-segment-routing-00, Network Working Group, Internet-Draft, Jun. 28, 2013, 29 pp.

Gredler, "Advertising MPLS labels in IGPs draft-gredler-rtgwg-igp-label-advertisement-00," IETF Trust, Inc., Mar. 3, 2011, 19 pp.

Gredler, et al., "North-Bound Distribution of Link-State and TE Information using BGP," draft-ietf-idr-ls-distribution-03, Inter-Domain Routing, Internet-Draft, May 21, 2013, 44 pp.

"Information Technology—Telecommunications and Information Exchange between Systems—Intermediate System to Intermediate System intra-domain routing information exchange protocol for use in conjunction with the protocol for providing the connectionless-mode network service (ISO 8473)," ISO, ISO/IEC 10589:2002, Second Edition, Nov. 15, 2002, 210 pp.

Moy, "OSPF Version 2," Network Working Group, RFC 2328, Apr. 1998, 204 pp.

Previdi, et al., "SPRING Problem Statement and Requirements," draft-ietf-spring-problem-statement-01, Network Working Group, Internet Draft, Jun. 26, 2014, 15 pp.

Rekhter et al., A Border Gateway Protocol (BGP-4) Network Group, RFC 4271, Jan. 2006, 94 pp.

Rosen, et al., "Multiprotocol Label Switching Architecture," Network Group, RFC 3031, Jan. 2001, 6 pp.

Thomas, et al., "LDP Capabilities," IETF Trust, Jul. 2009, 13 pp.

U.S. Appl. No. 14/023,396, by Hannes Gredler, filed Sep. 10, 2013.

U.S. Appl. No. 14/188,148, by Santosh Esale, filed Feb. 24, 2014.

U.S. Appl. No. 14/230,946, by Hannes Gredler, filed Mar. 31, 2014.

U.S. Appl. No. 61/765,515, by Hannes Gredler, filed Feb. 15, 2013.

Gredler et al., "Advertising Traffic Engineering Information in BGP," Inter-Domain Routing Internet Draft, draft-gredler-bgp-te-00, Mar. 3, 2011, 19 pp.

(56) References Cited

OTHER PUBLICATIONS

Gredler et al., "Advertising MPLS labels in IGPs," Routing Area Working Group Internet Draft, draft-gredler-rtgwg-igp-label-advertisement-02, Feb. 20, 2013, 10 pp.

Bryant et al., "Remote LFA FRR," Network Working Group Internet Draft, draft-ietf-rtgwg-remote-lfa-04, Nov. 22, 2013, 24 pp.

* cited by examiner

MICRO-LOOP PREVENTION USING SOURCE PACKET ROUTING

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as an interior gateway protocol (IGP). An interior gateway protocol may be a distance-vector protocol or a link state protocol. With a typical link state routing protocol, the routers exchange information related to available interfaces, metrics and other variables associated with links between network devices. This allows the routers to each construct a complete topology or map of the network. Some examples of link state protocols include the Open Shortest Path First (OSPF) protocol and the Intermediate-System to Intermediate System (IS-IS) protocol.

When there is a change in network topology either due to a link failure or due to a new link addition, network devices in the network determine an updated view of the network and re-compute routes. For instance, if a link failure occurs, network devices directly coupled to the failed link may notify other network devices in the network of the link failure. Due to network latency and network device configuration time, there may be a small time window when the forwarding state of each of the network devices is not synchronized. As a result, transient loops (or "micro-loops") may occur in the network where a particular network device, which has not yet converged to an updated network topology, sends traffic to a next-hop network device that has already converged to the updated network topology. As a result, the next-hop device may forward the traffic back to the particular network device, thus creating a micro-loop that results in traffic looping between the two network devices.

SUMMARY

In general, techniques are described for reducing or otherwise preventing micro-loops in an Internet Protocol (IP)/Multiprotocol Label Switching (MPLS) network using Source Packet Routing in Networking (SPRING). By advertising network device-specific labels, interconnected network devices implementing SPRING may enforce traffic flows through topological paths and services chains. Accordingly, each network device may configure its forwarding state based on node label ranges specific to network devices and adjacency labels specific to particular interfaces and/or network links of network devices. In the event of a link failure between two directly coupled network devices (points of local failure or "PLRs"), techniques of the present disclosure may prevent micro-loops by establishing a temporary network topology that network devices use to forward network traffic before converging to a final, new network topology. That is, although the PLRs may immediately notify other network devices of the link failure, the other network devices may not immediately begin converging to the final, new network topology and instead will temporarily forward traffic using the temporary network topology. By using the temporary network topology to forward network traffic, techniques of the disclosure enable the forwarding state of each of the network devices to become synchronized before using the final network topology, thereby reducing or otherwise preventing micro-loops.

To re-route network traffic in the temporary network topology, a PLR applies one or more adjacency labels to network packets, such that the network packets are forwarded using a backup sub-path. The backup sub-path, which circumvents the failed link, may include only a portion of an overall network path between a source and a destination router in the temporary network topology. A stack of adjacency labels correspond to a set of respective one-hop tunnels along the backup sub-path. Because the network packets are explicitly forwarded through the backup sub-path using one-hop tunnels along particular links/interfaces rather than according to node labels associated with device-specific label ranges, network packets may be forwarded to the destination although the forwarding states have not yet synchronized to establish new routes based on the device-specific label ranges.

In this way, network packets may be forwarded to the destination without micro-loops that would otherwise occur if the traffic forwarding state is not yet synchronized. Moreover, because the backup sub-path comprises only a portion of the network path, the remaining portions of the overall network path between the source and destination for the network traffic may remain unchanged in the temporary network topology. Specifically, routers forwarding network packets using the unaffected portions of the overall network path may employ a temporary label stack to forward such network packets in the temporary network topology. Thus, the backup sub-path that is temporarily used in the temporary network topology may prevent micro-loops, while only requiring re-routing through a limited portion of the overall network path. Furthermore, because the device-specific label ranges for the node labels and the adjacency labels for SPRING are advertised and exchanged when network devices are initially configured at network device startup, the labels and routes are known in advance of a link failure (and thus possible backup sub-paths), thereby potentially improving convergence times.

In some examples, a method includes detecting, by a near-side point of local failure (NPLR), a failure of a communication link that couples the NPLR and a far-side point of local failure (FPLR), wherein the NPLR and the FPLR are each network devices that implement a Source Packet Routing in Networking (SPRING) protocol to forward network packets using node labels according to an initial network topology of a network that comprises a plurality of other network devices; responsive to detecting the failure of the communication link, applying, by the NPLR and for a defined time duration, one or more adjacency labels to network packets destined for a destination network device, wherein the one or more adjacency labels define a set of one-hop tunnels corresponding to a backup sub-path that circumvents the failed communication link; forwarding, by the NPLR and according to a temporary network topology that is based on the set of one-hop tunnels that provide the backup sub-path, the network packets; and upon expiration of the defined time duration, forwarding, by the NPLR and according to a new network topology that is not based on applying the one or more adjacency labels that define the set of one-hop tunnels, network packets destined for the destination network device.

A network device, wherein the network device is a first PLR, the network device comprising: at least one processor; at least one module operable by the at least one processor to: detect a failure of a communication link that couples the first PLR and a second PLR, wherein the first PLR and the second PLR are each network devices that implement a Source Packet Routing in Networking (SPRING) protocol to forward network packets using node labels according to an initial network topology of a network that comprises a plurality of other network devices; responsive to detecting the failure of the communication link, apply, for a defined time duration, one or more adjacency labels to network packets destined for a destination network device, wherein the one or more adjacency labels define a set of one-hop tunnels corresponding to a backup sub-path that circumvents the failed communication link; forward, according to a temporary network topology that is based on the set of one-hop tunnels that provide the backup sub-path, the network packets; and upon expiration of the defined time duration, forward, according to a new network topology that is not based on applying the one or more adjacency labels that define the set of one-hop tunnels, network packets destined for the destination network device.

In some examples, a method includes: receiving, by a non-point of local failure (non-PLR) network device of a plurality of network devices in a segment routing domain, a link state advertisement that a communication link has failed between a near-side point of local failure (NPLR) and a far-side point of local failure (FPLR) that are each included in the segment routing domain, wherein the NPLR and the FPLR are each network devices that implement a Source Packet Routing in Networking (SPRING) protocol to forward network packets according to an initial network topology of a network that includes the plurality of network devices; responsive to receiving the link state advertisement, initiating, by the non-PLR network device, a timer; configuring, before the timer has expired, a forwarding state of the non-PLR network device, to forward network packets according to a new network topology; and forwarding, while the timer has not expired and by the non-PLR network device, network packets destined for the destination network device according to a temporary network topology that is different than the new network topology.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
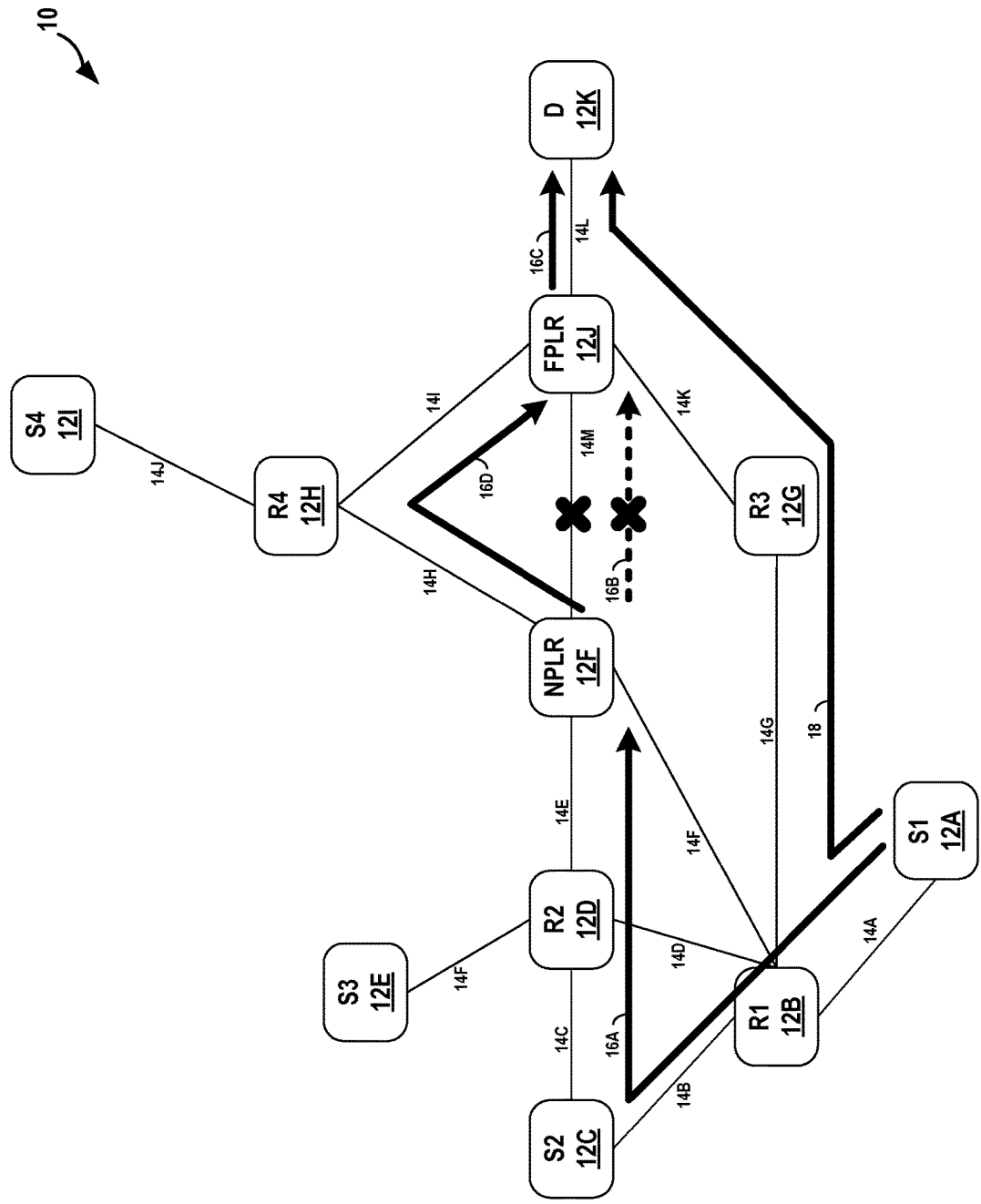
FIG. 1 is a block diagram illustrating an example system for reducing or otherwise preventing micro-loops in an Internet Protocol (IP)/Multiprotocol Label Switching (MPLS) network using Source Packet Routing in Networking (SPRING), in accordance with techniques of the disclosure.

FIG. 1 is a block diagram illustrating an example system for reducing or otherwise preventing micro-loops in an Internet Protocol (IP)/Multiprotocol Label Switching (MPLS) network using Source Packet Routing in Networking (SPRING), in accordance with techniques of the disclosure. FIG. 1 illustrates an example network 10 including routers 12A-12K (collectively, "routers 12") configured to forward traffic using IGP-distributed per-neighbor labels. Throughout this disclosure "router" and "node" may be used interchangeably. As shown in FIG. 1, each of routers 12 may be interconnected by one or more communication links 14A-14L (collectively, "links 14"). Each of links 14 may provide, as non-limiting examples, a 10- or 100-gigabit, physical connection. Communication links 14, generally, may be any wired or wireless links by which network packets traverse between two routers.

In the example of FIG. 1, some of routers 12 may be source routers that operate to ingress or otherwise inject or source network packets into network 10. Examples of source routers include routers 12A, 12C, 12E, and 12I. Some of routers 12 may be destination routers that operate to egress or otherwise drain network packets out of network 10. Examples of destination routers include router 12K. Some of routers 12 may be transit routers that forward traffic to other routers within network 10, and are not source or destination routers. Examples of transit routers include routers 12B, 12D, 12H, and 12G. As further described in this document, routers 12 may include near-side point of local repair (NPLR) and far-side point of local repair (FPLR), which are each routers that could be source, destination or transit routers. For purposes of FIG. 1, routers 12 include router 12F as an NPLR and router 12J as a FPLR. In some example, source routers and destination routers may be coupled to one or more customer devices (not shown) with access to network 10. While discussed herein with respect to a particular network device, i.e., a router, any one or more of routers 12 may represent any network device that routes, switches, bridges or otherwise forwards network traffic directed to or originating from the network. For example, any one or more of routers 12 may each represent, in certain instances, one or more of a switch, a hub, a bridge device (e.g., an Ethernet bridge), or any other L2 network device and, in some instances, L3 network devices capable of performing L2 functionality.

Routers 12 in network 10 each maintain routing information that describes available routes through network 10. Upon receiving an incoming packet, each of the routers examines information within the packet and forwards the packet in accordance with the routing information. In order to maintain an accurate representation of network 10, routers 12 exchange routing information, e.g., bandwidth availability of links, in accordance with a defined routing protocol, such as an Interior Gateway Protocol (IGP). For example, each of the routers may use a link-state routing protocol, such as the Open Shortest Path First (OSPF) protocol or the Intermediate-System to Intermediate System (IS-IS) protocol, to exchange link-state routing information to learn the topology of network 10. Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

Each of routers 12 may use a Source Packet Routing in Networking (SPRING) protocol to forward network packets within network 10. Further details regarding SPRING are found in (1) "Segment Routing Architecture," IETF draft: draft-filsfils-spring-segment-routing-04, Jul. 3, 2014; and "SPRING Problem Statement and Requirements," and (2) IETF draft: draft-ietf-spring-problem-statement-01, Jun. 26, 2014, and (3) "Segment Routing with MPLS data plane," IETF draft: draft-filsfils-spring-segment-routing-mpls-03, Aug. 1, 2014, the entire contents of which are incorporated by reference herein.

In general, SPRING provides segment routing (SR) within an IGP domain that allows routers to advertise single or multi-hop label switched paths LSPs within the IGP domain. For segment routing, the "path" information is disseminated between the routers as part of the IGP link state information for the domain. Routers are able to steer packets through a controlled set of segments defining a path by prepending an SR header (e.g., a label) to the packets. Segment routing allows routers to enforce a flow through any topological path and service chain while maintaining per-flow state only at the ingress node to the SR domain. One advantage of segment routing is that the segment routing architecture can be directly applied to the MPLS data plane with no change in the forwarding plane.

In this example, routers 12, that are included in an SR domain, exchange labels in accordance with the SPRING protocol. One or more routers may be configured in an SR domain, which provides a realm of administrative autonomy, authority or control for routing packets according to the SPRING protocol. In the example of FIG. 1, each of routers 12 in network 10 is included in the same SR domain.

Each of routers 12 operates as a label switching router (LSR) that distributes labels to neighboring LSRs within network 10 to support SPRING forwarding along routed paths within network 10. SPRING includes multiple different label types including "adjacency" labels and "node" labels. In some examples, the terms "segment" and "label" may be used interchangeably in this disclosure. To forward a packet through network 10, one or more of routers 12 may push (and pop) one or more labels in a label stack (e.g., a "segment list") that is applied to the packet as it is forwarded through the network. The label stack may encode the topological and service source route of the packet.

Different types of SPRING labels are further described hereinafter. An adjacency label may have a local semantic to a particular SR node, such as one of routers 12. In particular, an adjacency label steers traffic onto an adjacency (e.g., communication link and/or interface) or set of adjacencies. Thus, an adjacency label may be related to a particular router. To use an adjacency label, a router may initially assign the adjacency label to a particular adjacency and advertise it to other routers in the SR domain using ISIS or OSPF. The router may be the only router in the SR domain to use the particular adjacency label. When an ingress router forwards a packet using the adjacency label, the packet may be forced, by the ingress router, to use the adjacency for the ingress router associated with the adjacency label. In this way, adjacency labels may be used to establish one-hop tunnels within network 10.

A node label, by contrast, may have a global semantic within an SR domain. That is, each of routers 12 may be assigned a defined node label range that is unique to each respective router within the SR domain. An operator of network 10 may ensure unique allocation of the different node label ranges from a global range to different routers. In addition to a node label range, each particular router may also have a specific node identifier that uniquely identifies the particular router in the SR domain. Each respective router may advertise its respective node identifier and node label range to other routers in the SR domain using ISIS or OSPF.

Based on routes determined using equal-cost multi-path routing (ECMP) and/or best-path routing, each of routers 12 may configure its forwarding state to push and pop node labels (corresponding to other nodes in the network) onto packets in order to forward such packets using the determined route to the destination. For instance, each of routers 12 may perform path selection using topology information learned by way of IGP to compute a shortest path within network 10 on a hop-by-hop basis based on the routing information maintained by the routers. Each of routers 12 may then select a next hop along the locally computed shortest path and install forwarding information associated with the selected next hop in a forwarding plane of the router, wherein the forwarding information identifies a network interface to be used when forwarding traffic and one or more labels to be applied when forwarding the traffic out the interface. The routers use the next hops with the assigned labels to forward traffic hop-by-hop.

To illustrate the use of node labels, router 12A may initially inject a packet into network 10 that is destined for router 12K. Router 12A determines, based on its forwarding state, that a path to router 12K includes router 12B as the next-hop. Router 12A may apply a node label that indicates the node identifier for router 12K, and the node label may be within a label range assigned to 12B. In some examples, the node label is encoded to indicate both the node identifier and that the label is within a particular label range. Upon receiving the packet, router 12B may determine, based on the node label, a route to router 12K that includes router 12C. Router 12B may pop the node label from the packet that was previously applied by router 12A, and push a label onto the packet that indicates the node identifier for router 12K, and the label may be within a label range assigned to 12C. The packet is processed and forwarded in a similar manner by each of routers 12 on the path from router 12A to router 12K. In this way, any router in the SR domain may forward a packet to any other router in the network by applying the appropriate node label.

One or more of routers 12 are configured in accordance with one or more of the techniques described herein to provide protection against small transient loops (also referred to herein as "micro-loops") that may emerge due to link failure or other topology change events. To illustrate, conventional networks utilizing IP-based hop-by-hop routing may experience short-term micro-loops that may provide substantial congestion on one or more links. As a specific example, NPLR router 12F may discover that communication link 14M has failed between NPLR router 12F and FPLR 12J and, in response, recompute a path for reaching destination router 12K as {12F, 12H, 12J, 12K}. Upon reprogramming its forwarding plane, NPLR router 12F forwards traffic destined for destination router 12K to router 12H.

In some situations, the IGP routing protocol on router 12H may not yet have learned of the failure of link 14M and/or completed path selection and forwarding plane reprogramming. If router 12H was previously configured to forward network traffic to destination router 12K using a route {12H, 12F, 12J, 12K}, router 12H employing conventional techniques may forward the traffic in accordance with the currently selected path {12H, 12F, 12J, 12K}. In such an example where router 12H has not yet updated its forwarding state although NPLR 12F has updated its forwarding state, a potentially highly-problematic micro-loop would be formed between source router 12H and 12F because router 12F would send the network traffic back to router 12H, which just sent the network traffic to router 12F. Where router 12F and router 12H employ conventional routing techniques, traffic loops between the routers may ultimately consume all of the available bandwidth until the IGP of router 12H converges and computes a new shortest path to destination router 12K by way of 12J. Although described with respect to link failures, techniques of the disclosure may also be applied to prevent or otherwise reduce microloops caused by "link-up" event in which a new link is added to the network. Link-up and link failures may be referred to as link state events.

As further described with respect to FIG. 1, techniques are provided for reducing or otherwise preventing micro-loops in an Internet Protocol (IP)/Multiprotocol Label Switching (MPLS) network, such as described above with respect to routers 12H and 12F, by using Source Packet Routing in Networking (SPRING). The techniques will be described with respect to router 12A (e.g., a source router) sending network traffic to router 12K (e.g., a destination router), although such techniques are applicable to sending traffic between any source and destination in network 10.

Initially, packets are forwarded through the network according to a path that includes {12A, 12B, 12C, 12D, 12F, 12J, 12K} using node labels as described above. Three sub-paths 16A, 16B, and 16C collectively form path 16 that includes {12A, 12B, 12C, 12D, 12F, 12J, 12K}. Sub-path 16A includes {12A, 12B, 12C, 12D, 12F}, sub-path 16B includes {12F, 12J}, and sub-path 16C includes {12J, 12K}.

A topology change may occur within network 10, such as communication link 14M failing. That is, NPLR router 12F may detect a failure of a communication link 14M that directly couples the NPLR router 12F and FPLR router 12J. Upon detecting the link failure, NPLR 12F (and in some examples, FPLR 12J) sends a link-state advertisement to all other routers in the SR domain. The link-state advertisement may indicate that link 14M has failed. As further described below, responsive to the link failure, routers 12 may use adjacency labels, for a defined time duration, to establish a temporary network topology with a back-up sub-path that circumvents only the portion of network 10 affected by the failure of link 14M. In this way, routers 12 may avoid the creation of micro-loops by continuing to forward network packets using unaffected sub-paths 16A and 16C of network 10 in a similar manner as prior to the failure of link 14M, while ensuring that the forwarding states of all of routers 12 are able to synchronize within the defined time duration before converging from the temporary network topology to a new network topology.

In the current example, responsive to receiving a link-state advertisement that link 14M has failed, each other router in the SR domain (e.g., in network 10 in the example of FIG. 1) may not immediately begin converging to a new topology that does not include link 14M. Instead, each of the other routers in network 10, excluding PLR routers 12F and 12J, may start a timer having a maximum convergence time duration. The maximum convergence time duration is a time interval that is set in all routers 12. The time interval of the maximum convergence time duration indicates a maximum amount of time for each of routers 12 to update its forwarding state to reflect the change in network topology caused by link failure 14M and recompute routes that do not include communication link 14M. Rather than immediately forwarding network packets according to a new network topology that does not include 14M, each of routers 12 may configure its forwarding state to use a new network topology that does not include 14M, but may only begin using the new network topology after the timer having the maximum convergence time has expired.

To illustrate, router 12A may receive a link-state advertisement from NPLR 12F that link 14M has failed. Router 12A may start a timer having a maximum convergence time duration and may not immediately converge to a new network topology in which it forwards packets to destination router 12K using a path 18 that includes {12A, 12B, 12G, 12J, 12K}. Rather, router 12A determines updated routes through network 10 for destinations affected by the failure of communication link 14M and configures its forwarding state accordingly to apply node labels based on the updated routes, but continues to forward network traffic based on the original network topology, until the timer having a maximum convergence time duration has expired.

As further described in FIGS. 2A-2E, while using the temporary network topology, routers in network 10 may use different, updated stacks of labels to temporarily forward network packets. Upon the maximum convergence time elapsing, router 12A begins forwarding network traffic to destination router 12K using path 18. By not immediately converging to a new network topology in accordance with techniques of the disclosure, each router has a sufficient and defined amount of time to configure its forwarding state. In this way, the techniques may avoid the creation of microloops in which routers with unsynchronized forwarding information immediately begin forwarding packets on the new network topology in response to link-state advertisements.

In contrast to non-PLR routers (e.g., all routers except NPLR router 12F and FPLR router 12J), router 12F, in response to detecting the failure of link 14M, initiates a timer having a having a "maximum PLR duration" equal to:

$$2*(\text{maximum convergence time duration}) + \text{maximum flooding duration}$$

The maximum flooding duration may be equal to an amount of time used by a PLR router to flood network 10 with link state advertisements. The "maximum PLR duration" initiated by the PLR is also known by all of routers 12 in network 10 (e.g., within the SR domain) based on exchanging the maximum flooding duration and maximum convergence time durations when each router is initially configured and started up.

During the maximum PLR duration, NPLR 12F may re-route network traffic destined for destination router 12K using backup sub-path 16D that is included in a temporary network topology. Specifically, upon determining the failure of link 14M, NPLR router 12F re-configures its forwarding state to forward network traffic destined to destination router 12K using backup sub-path 16D. In some examples, backup sub-path 16D is pre-computed by NPLR router 12F in advance of the failure of link 14M, while in other examples backup sub-path 16D is computed in response to a link failure. In any case, NPLR router 12F configures its forwarding plane to apply a stack of one or more adjacency labels to network packets destined for destination router 12K that forces the network packets onto respective adjacencies between NPLR 12F and FPLR 12J, i.e., communication link 14H and 14I. In this way, NPLR router 12F may forward the network packets using a set of one or more one-hop tunnels between NPLR router 12F and router 12J.

For purposes of this disclosure, an original or initial network topology, may refer to a logical topology in which node labels are applied by routers 12 in a physical topology prior to a link failure. A temporary network topology, as described in this disclosure, may refer to a logical topology in which a stack of adjacency labels are applied by one or more PLR routers to circumvent a failed communication link using a backup sub-path. In some examples of the temporary network topology, non-PLR routers may have not yet converged to a new network topology, and may apply a temporary node label stack to network packets destined for the destination as further described herein. A new or final network topology, as described in this disclosure, refers to a logical topology in which the PLR routers no longer use the stack of adjacency labels to forward network packets along the backup-sub path, but instead use node labels to forward network packets to a destination router while circumventing the failed network link. In a new network topology, one or more non-PLR routers use a node label stack to send network packets to a destination router that is different than a node label stack used to send network packets in the original network topology.

By using a stack of one or more adjacency labels rather than node labels to forward the network packets to router 12H for a defined time duration, techniques of the disclosure may prevent micro-loops that would otherwise occur if the forwarding state of NPLR router 12F were updated but the forwarding state of router 12H had not yet been updated. That is, if routers 12F and 12H both continued forwarding network packets using node labels, but the assignments between node labels and routes in the forwarding state of router 12H were not updated, router 12H might potentially send the network packets back to NPLR router 12F because reconfiguration of node labels corresponding to particular routes at router 12H had not yet occurred although such reconfiguration had occurred at NPLR 12F. Thus, techniques of the disclosure may prevent micro-loops by forwarding the network packets using the one-hop tunnel from router 12F to router 12H.

By using a stack of adjacency labels to provide one-hop tunnels in backup sub-path 16D that circumvents failed link 14M and re-routes traffic from NPLR router 12F to FPLR router 12J, techniques of the disclosure allow all other routers except those directly affected by the unavailability of sub-path 16B to continue forwarding network packets destined to destination router 12K in a similar manner prior to the failure of link 14M. That is, routers using sub-paths 16A and 16C may continue to forward network traffic in a similar manner prior to the failure of link 14M (but with a different stack of node labels, in some examples, as further described in FIGS. 2A-2E) until the expiration of the maximum convergence time duration. In this way, using the temporary network topology that includes sub-paths 16A, 16D and 16C may require less forwarding state reconfiguration across all of routers 12, while still avoiding micro-loops and providing fast re-routing.

As previously described, each non-PLR router of routers 12 re-configures its forwarding state to use a new network topology that does not include link 14M within the maximum convergence time duration, but does not actually converge to the new network topology until the maximum convergence time duration has elapsed. Upon expiration of the respective timers at each respective non-PLR router of routers 12, each non-PLR router begins forwarding network packets according to its updated forwarding state using the new topology.

Finally, after the expiration of a timer equal to the maximum PLR duration, NPLR router 12F may converge onto the new network topology. In accordance with the new network topology, upon receiving a network packet from router 12D that is destined for destination router 12K, NPLR router 12F applies one or more node labels to forward the network packet to router 12H, rather than applying a stack of one or more adjacency labels that were used in the temporary network topology. In this way, router 12F, using the new network topology after maximum PLR duration, may forward network packets to destination router 12K using node labels. Router 12H upon receiving the network packet may pop the node label from the packet that corresponds to NPLR router 12F, push a node label to the packet that corresponds to router 12H, and forward the network packet to FPLR router 12J. As another example, router 12B, which previously used path 16 to forward network traffic, using the new network topology, from router 12A to destination router 12K, may use path 18 based on its updated forwarding state. That is, router 12B, upon receiving a network packet from router 12A, may pop a node label that corresponds to router 12A from the packet, push a label onto the packet that corresponds to router 12B, and forward the network packet to router 12G, rather than router 12C, based on the updated forwarding state of router 12B. Accordingly, in some examples, all routers implementing techniques of this disclosure may converge according to the process described in this disclosure. Thus, in some examples, router 12B may also use a same two step convergence other routers, even though converging to path 18 may not cause any micro-loop.

Figure 2A:
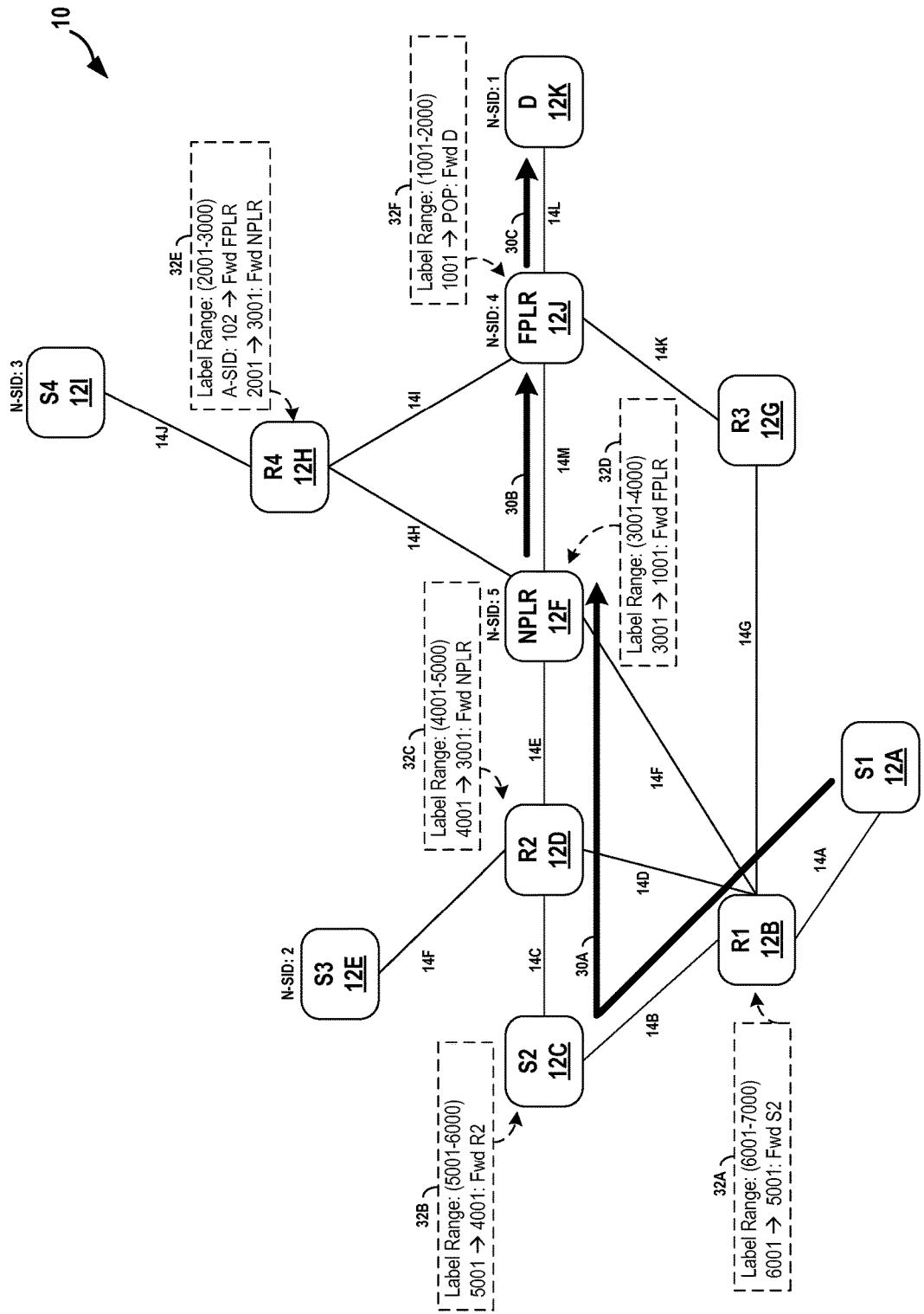
FIGS. 2A-2E are block diagrams illustrating, in further detail, an example system for reducing or otherwise preventing micro-loops in an Internet Protocol (IP)/Multiprotocol Label Switching (MPLS) network using Source Packet Routing in Networking (SPRING), in accordance with techniques of this disclosure.

FIGS. 2A-2E are block diagrams illustrating, in further detail, an example system for reducing or otherwise preventing micro-loops in an Internet Protocol (IP)/Multiprotocol Label Switching (MPLS) network using Source Packet Routing in Networking (SPRING), in accordance with techniques of this disclosure. As shown in FIGS. 2A-2E, network 10 of FIG. 1 is again illustrated with routers 12 and communication links 14. FIG. 2A illustrates example portions of forwarding states 32A-32F ("forwarding states 32") of various routers 12. Forwarding state 32A is included at router 12B, forwarding state 32B is included at router 12C, forwarding state 32C is included at router 12D, forwarding state 32D is included at router 12F, forwarding state 32E is included at router 12H, forwarding state 32F is included at router 12J.

To illustrate information included in forwarding states 32, forwarding state 32A is further described herein for exemplary purposes. Forwarding state 32A may include a node label range 6001-7000 this is set at initial startup and configuration of router 12B. Node label range 6001-7000 may be globally unique to router 12B among all other routers within the SR domain. Forwarding state 32A may also include information that indicates a forwarding action performed by router 12B. In particular, the information may specify the following: 6001→5001: Fwd S2. This information causes router 12B, upon receiving a packet that includes node label 6001 to push node label 5001 onto the packet and forward to S2, which is router 12C. In some examples, router 12B may also pop node label 6001 prior to pushing node label 5001 onto the packet.

Router 12B may determine that router 12C is the next hop for the packet based equal-cost multi-path routing (ECMP) and/or best-path routing performed by router 12B. That is, router 12B, may set up or otherwise configure forwarding state 32A to forward network packets received by router 12B with node label 6001 to router 12C, while applying node label 5001, based on a route determined using equal-cost multi-path routing (ECMP) and/or best-path routing. To configure forwarding states of respective routers, at initial configuration and startup of each of routers 12, each router may advertise its label range and node identifier. Each router configures its forwarding state based on information it receives that indicates the unique label range and node identifier for each other router of routers 12. Router 12K has a node identifier of 1 (e.g., N-SID: 1, as shown in FIG. 1), router 12E has a node identifier of 2, router 12I has a node identifier of 3, router 12J has a node identifier of 4, and router 12F has a node identifier of 5. In other words, in some examples, before detecting the failure of a communication link, NPLR router 12F may receive at least one node label or range of node labels from one of the plurality of other network devices, wherein the at least one node label or range of node labels uniquely identifies the one of the plurality of other network devices in a segment routing domain that includes NPLR router 12F, FPLR router 12J and the plurality of other network devices. As further described herein, NPLR router 12F may configure its forwarding state to apply the at least one node label or range of node labels that uniquely identifies the one of the plurality of other network devices to network packets destined for the destination network device.

One or more of routers 12 include respective forwarding states configured to apply node labels to forward network packets in network 10. As one example, if router 12A injects a packet into network 10 that is destined for destination router 12K, it may push a label 6001 onto the packet and forward it to router 12B. Label 6001 may be encoded to indicate both the node identifier of the destination router and a value within a range of a next hop router on the path to the destination router. For instance, the least significant digit of 6001 is a 1, which corresponds to the node identifier of destination router 12K. Since the next hop router is router 12B for a network packet destined to router 12K from router 12A, router 12A may push a label with the value 6001 onto the packet. Based on the forwarding information included in forwarding states 32, each of routers 12B, 12C, 12D, 12F, and 12J forward the network packet to destination router 12K as described above. As shown in FIG. 2A, the network packet sent by router 12A to destination router 12K may traverse sub-paths 30A-30C, which collectively comprise path 30.

In addition to advertising node labels, each of routers 12 may advertise adjacency labels to other routers of routers 12. For instance, router 12H may configure its forwarding state to forward any packet with an adjacency label having a value of 102 onto communication link 14I, as shown in FIG. 2A. Router 12H may advertise the adjacency label to NPLR router 12F among other routers, which can apply the adjacency label to network packets forwarded to router 12H, and which in turn causes router 12H to forward the network packet onto link 14I to FPLR router 12J. As further described below, in the event of a link failure, rather than using a node label to re-route network packets destined for destination router 12K to router 12H, which may introduce micro-loops if the one or more of forwarding states 32D and 32E have not yet been updated, NPLR router 12F may apply one or more adjacency labels to the network packets to re-route the packets on a backup sub-path around failed communication link 14M.

In addition to configuring forwarding states at initial configuration, each of routers 12, in accordance with techniques of the disclosure, may store a maximum flooding duration (or "MAX_FLOODING_DELAY" value) and maximum convergence time duration (or "MAX_CONVERGENCE_DELAY" value). In some examples, routers 12 may store a maximum PLR time duration based on MAX_FLOODING_DELAY and MAX_CONVERGENCE_DELAY, or may alternatively determine the maximum PLR time duration at runtime. In some examples, the maximum convergence time duration may be 1.6 seconds. In some examples, the maximum convergence time duration may be in a range of 0.1-5.0 seconds. In some examples, maximum flooding duration may be 0.5 seconds. In some examples, maximum flooding duration may be in a range of 0.1-5.0 seconds. As further described, in FIG. 2B, each of routers 12 may set one or more timers according to MAX_FLOODING_DELAY and MAX_CONVERGENCE_DELAY in the event of a link failure. In some examples, MAX_CONVERGENCE_DELAY interval may be at least 3 times that of MAX_FLOODING_DELAY. In some examples, MAX_CONVERGENCE_DELAY may be the time needed by slowest router in the network to converge.

In accordance with techniques of the disclosure, one or more of routers 12 may pre-compute one or more backup sub-paths that enable the respective routers to continue forwarding packets to destinations in the event of a link failure. As one example, NPLR router 12F may determine that a backup sub-path to FPLR router 12J exists using communication links 14H and 14I, if communication link 14M fails. Accordingly, NPLR router 12F may store information in forwarding state 32D that indicates a route corresponding to the backup sub-path that includes communication links 14H and 14I. As further described in FIG. 2B, in the event that communication link 14M fails, NPLR router 12F may re-route a network packet destined for destination router 12K to router 12H by applying a stack of one or more adjacency labels to the packet and forwarding it using communication link 14H. In other words, NPLR 12F may, before detecting the failure of the communication link, receive one or more adjacency labels from one or more of the plurality of other network devices and pre-compute the backup sub-path that does not include the communication link. After detecting the failure of the communication link: NPLR router 12F may configure, based on the pre-computing of the backup sub-path, a forwarding state of the NPLR to apply the one or more adjacency labels to network packets destined for the destination network device. Although described with respect to NPLR router 12F, one or more other routers of routers 12 may similarly store information in their respective forwarding states that indicate routes corresponding to backup sub-paths.

Figure 2B:
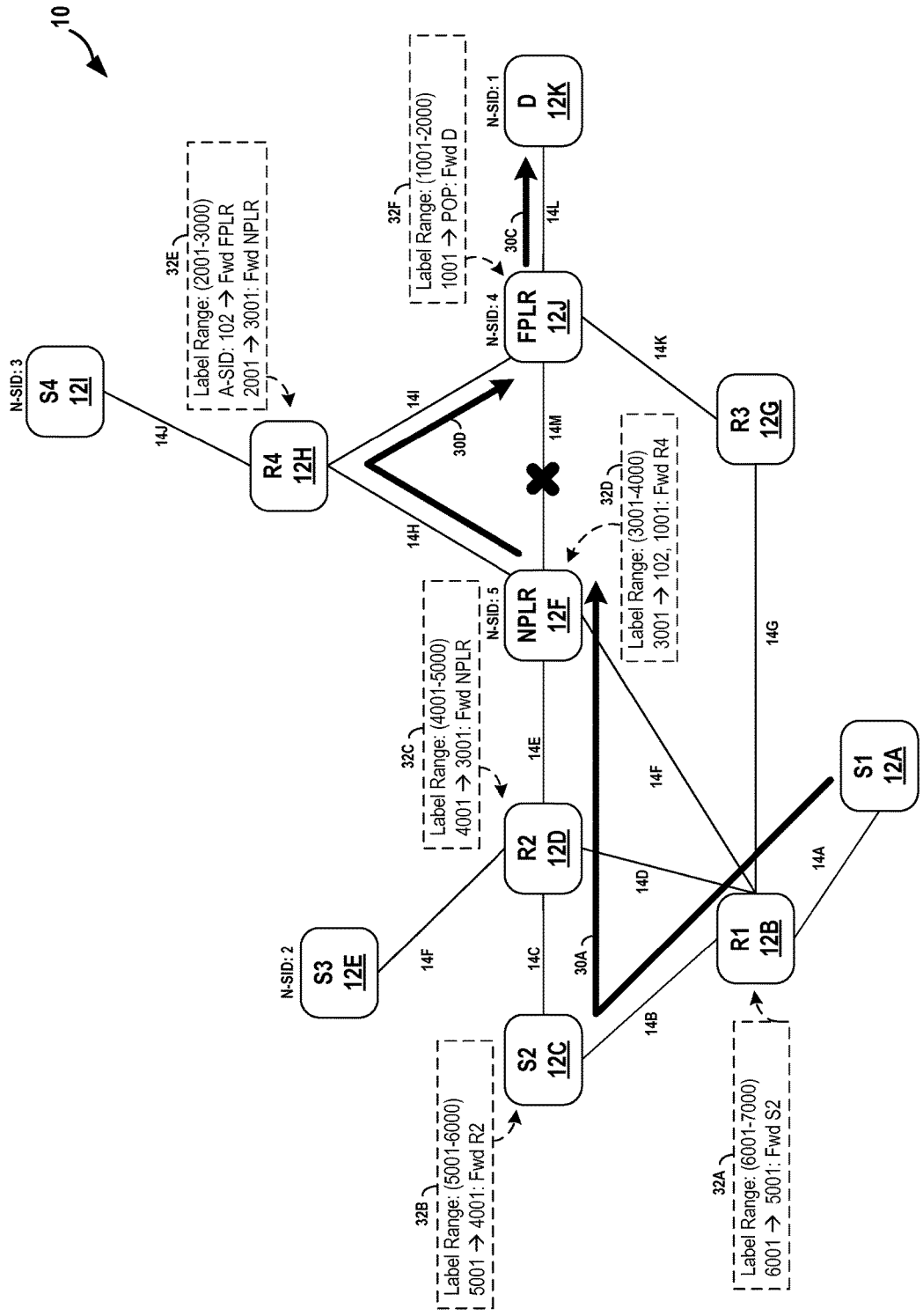

In FIG. 2B, NPLR router determines that link 14M has failed. Responsive to determining the link failure, NPLR router 12F floods the link-down/link-up event to all other routers in the network (including transit and source routers), for example, using link-state advertisements. In some examples, NPLR router 12F sets a timer T1 equal to a duration or interval of MAX_FLOODING_DELAY. NPLR router 12F may flood link-state advertisements until timer T1 expires. NPLR router 12F may compute a new backup sub-path 16D to FPLR router 12J at the time of link failure, or alternatively, at initial configuration and startup. In any case, based on determining backup sub-path 16D, NPLR router 12F may construct a list of one or more adjacency labels that correspond to each of the communication links on backup sub-path 16D computed by NPLR router 12F. In other words, NPLR 12F constructs a segment list using adjacency segments (instead of a single node segment) for each of the links on the new path computed. In the example of FIG. 2B, NPLR router 12F may include adjacency label 102 in the adjacency list.

NPLR router 12F configures its forwarding state 32D to push a label stack onto a packet destined for destination router 12K that includes the adjacency label 102 in addition to the node label of FPLR router 12J that would otherwise be applied prior to the failure of communication link 14M. Accordingly, forwarding state 32D includes information 3001→102, 1001: Fwd R4 that causes NPLR router 12F, upon receiving a packet destined to destination router 12K, to apply a label stack that includes adjacency label 102 and node label 1001, and forwards the packet to router 12H (e.g., "R4"). In this way, NPLR router 12F programs the segment list that includes the adjacency label(s) for the backup sub-path as the nexthop for all affected destinations which use the affected link/node (i.e., communication link 14M) as a primary nexthop (within its own segment routing global block, a.k.a. SRGB). Consequently, if NPLR router 12F receives a packet with the node segment for FPLR router 12J, NPLR router 12F will forward the traffic along backup sub-path 16D and avoid failed communication link 14M. NPLR router 12F also holds convergence for each of the affected destinations (IP/IPV6/MPLS/SPRING) on to the new path in its data plane.

NPLR router 12F may also initiate another timer upon detecting link failure 14M. In particular, NPLR router 12F may start a timer T2 with an interval equivalent to:

2*MAX_CONVERGENCE_DELAY+ MAX_FOODING_DELAY

As further described below, NPLR router 12F may, upon expiration of T2, update its forwarding decisions in order to converge on the new network topology using an updated path from source router 12A to destination router 12K. In other words, responsive to detecting the failure of the communication link, NPLR router 12F, for a defined time duration, applies one or more adjacency labels to network packets destined for a destination network device, wherein the one or more adjacency labels define a set of one-hop tunnels corresponding to a backup sub-path that circumvents the failed communication link. NPLR router 12F may forward the network packets according to a temporary network topology that is based on the set of one-hop tunnels that provide the backup sub-path.

Each of routers 12, excluding NPLR router 12F and FPLR router 12J, upon receiving a link-state advertisement that indicates the failure of communication link 14M, starts a timer T3 with an interval that is equivalent to the maximum convergence delay (MAX_CONVERGENCE_DELAY). Each non-PLR router does not converge to the new network topology until timer T3 expires.

Figure 2C:
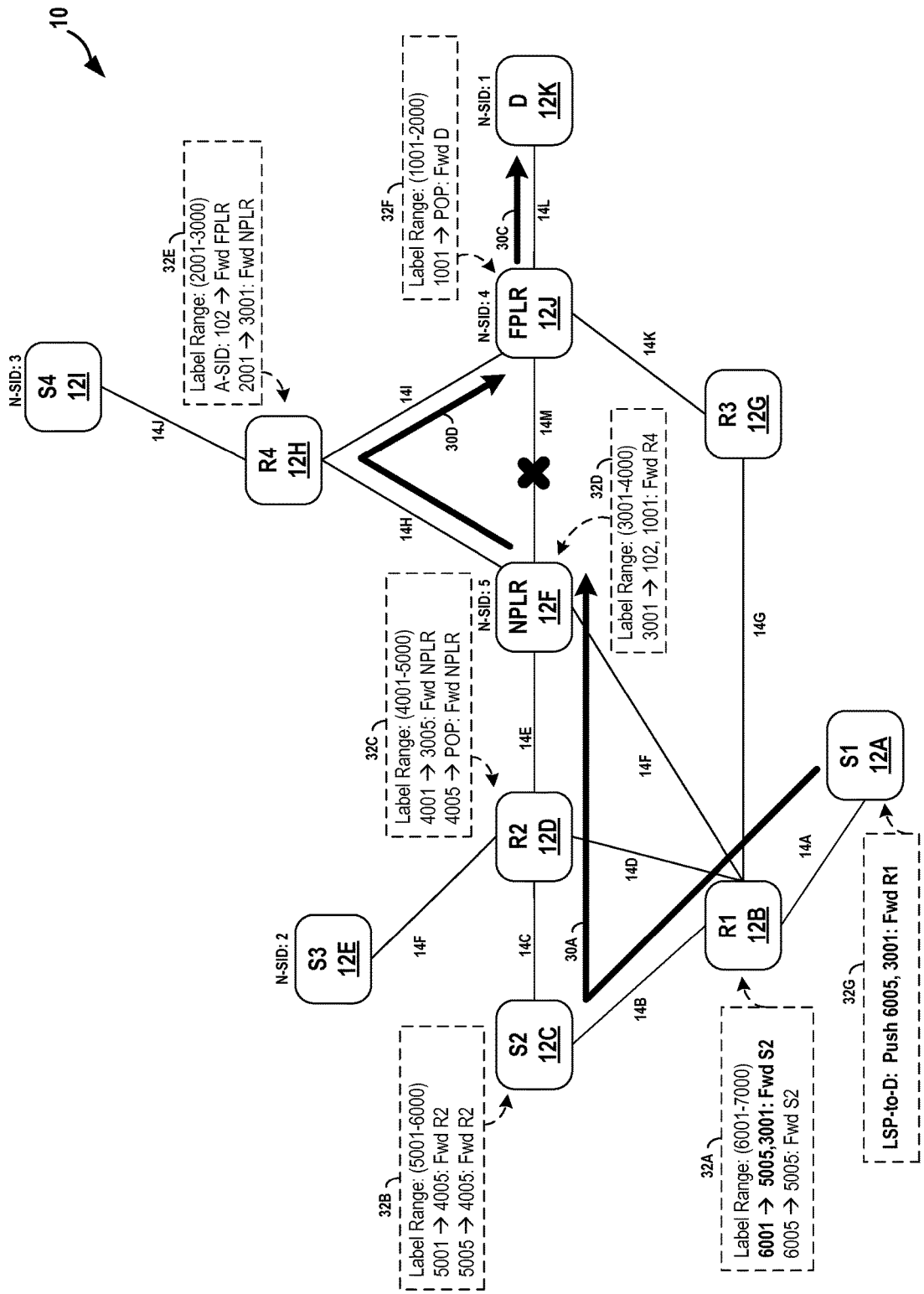

In FIG. 2C, upon receiving a link-state advertisement that indicates the failure of communication link 14M, each of the source routers, including source routers 12A, 12C, 12E, and 12F, may perform further configuration of its respective forwarding state. Specifically, each of the source routers may determine destinations that are affected by the failure of communication link 14M, such as destination router 12K. For instance, source router 12A determines that path 30 to destination router 12K has been affected by the failure of communication link 14M. Responsive to this determination, source router 12A computes a label stack with a first node label that corresponds to router 12B along path 30 and a second node label that corresponds to NPLR router 12F. In other words, upon receiving the link-down event via IGP, each source router computes a segment list with following segments: (1) a node segment for reaching near-side PLR (e.g., router 12B in the case of source router 12A), (2) followed by a node segment advertised by the near-side PLR (e.g., NPLR 12F in the case of source router 12A) for the destination (e.g., destination router 12K).

Each source router configures its forwarding state to apply its respective label stack to each network packet injected into network 10 that is destined for destination router 12K. For example, router 12A (a source router), when injecting a packet into network 10 that is destined for destination router 12K applies a label stack that includes (1) a node label 6005 (e.g., a node segment ID for router 12B that is used for reaching NPLR router 12F) and (2) a node label 3001 (a node segment ID advertised by NPLR router 12F that is used for reaching destination router 12K). In other words, forwarding, while the timer T3 has not expired, network packets destined for the destination network device according to the temporary network topology may include: responsive to determining that the network packets are destined for the destination network device, applying, by the non-PLR router (e.g., a source router or a transit router), a label stack (e.g., a temporary label stack) to each of the network packets, wherein the label stack includes (1) a first node label that corresponds to a next hop router on a path to reach the NPLR; and (2) a second node label that corresponds to destination. Then, responsive to the expiration of timer T3, the non-PLR router may forward network packets destined for the destination network device according to the new network topology.

Accordingly, router 12A includes forwarding state 32G that indicates LSP-to-D: Push 6005, 3001: Fwd R1. Forwarding state 32G causes source router 12A to, when injecting a packet into network 10 that is destined for router 12K, apply a label stack that includes node labels 6005 and 3001, and forward the network packet to router 12B. As shown in FIG. 2C, the node segment for reaching the near-side PLR, i.e., 6005, includes a least significant digit of 5, which corresponds to the node identifier of NPLR 12F. The node segment ID for reaching the near-side PLR is therefore encoded with a node identifier of the near-side PLR as the destination, while the node segment advertised by the near-side PLR, i.e., 3001, is encoded with the node identifier of the destination for the packet that is destination router 12K.

As described above, each source router programs the corresponding route in its forwarding state with the above segment ID list computed above. This causes all IP/IPV6/

MPLS packets to be sent to the destination, to be encapsulated in a SPRING data-plane header with the segment list computed above, forcing the packet to go all the way to near-side PLR router 12F. The packet, on reaching near-side PLR 12F, is forwarded to the far-side PLR router 12J on a path (e.g., backup sub-path 30D), computed by near-side PLR 12F, thereby avoiding the failed link. On reaching the far-side PLR router 12J, the packet is forwarded on its regular path from the far-side PLR to destination router 12K.

As described in FIG. 2C, upon receiving a link-state advertisement that communication link 14M has failed, source router 12A uses a temporary network topology comprised of sub-paths 30A, 30D, and 30B to forward network traffic to destination router 12K. While using the temporary network topology, source router 12A re-configures its forwarding state to use a new network topology as described in FIG. 2E, but does not converge to the new network topology until its timer T3 expires. In this way, each of routers 12 has a duration of MAX_CONVERGENCE_DELAY to update its forwarding state to use the new network topology, while still forwarding network traffic using the temporary network topology.

In other words, a non-PLR router may configure, before timer T3 has expired, its forwarding state to forward network packets according to the new network topology, but forward, while the timer T3 has not expired, network packets destined for the destination network device according to the temporary network topology. In such examples, forwarding network packets destined for the destination network device according to the new network topology may include the non-PLR router applying, to a first network packet destined for the destination network device, a first node label that is different than a second node label, wherein the second node label was applied to a second network packet based on the original network topology, and wherein the second network packet was destined for the same destination network device.

Figure 2D:
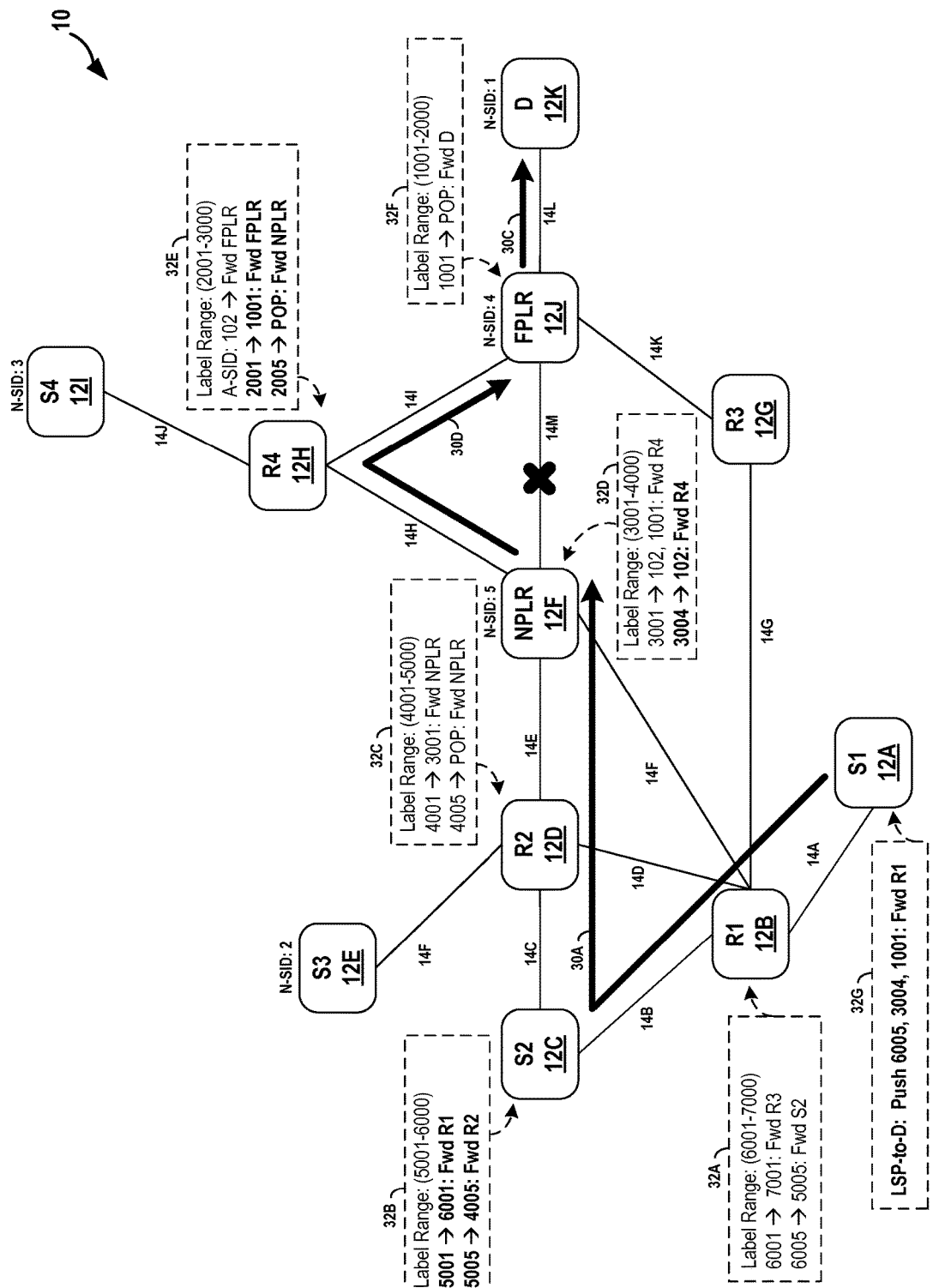

FIG. 2D illustrates the expiration of timer T3 at all of the non-PLR routers. At the expiration of timer T3, each non-PLR router triggers normal convergence and converges onto the new network topology. For instance, upon expiration of timer T3, each of source routers 12A, 12C, 12E, and 12F configures its respective forwarding state in the following manner. Using source router 12A as an example, upon expiration of its timer T3, source router 12A computes a label stack with a first node label that corresponds to router 12B along path 30, a second node label that corresponds to NPLR router 12F, and a third label that corresponds to FPLR router 12J. In other words, upon expiration of timer T2, each source router computes a segment list with following segments: (1) a node segment for reaching near-side PLR (e.g., router 12B in the case of source router 12A), (2) a node segment advertised by the near-side PLR (e.g., NPLR 12F in the case of source router 12A), and (3) a node segment advertised by the far-side PLR (e.g., FPLR 12J in the case of source router 12A) for the destination (e.g., destination router 12K).

As described in the example above with respect to source router 12A, each source router configures its forwarding state to apply its respective label stack (e.g., segment list) to each network packet injected into network 10 that is destined for destination router 12K. For example, router 12A (a source router), when injecting a packet into network 10 that is destined for destination router 12K applies a label stack that includes (1) a node label 6005 (e.g., a node segment for router 12B that is used for reaching NPLR router 12F) (2) a node label 3004 (a node segment advertised by NPLR router 12F that is used for reaching FPLR 12J), and (3) a node label 1001 (a node segment advertised by FPLR router 12J that is used for reaching destination router 12K). Accordingly, router 12A includes forwarding state 32G that indicates LSP-to-D: Push 6005, 3004, 1001: Fwd R1. Forwarding state 32G causes source router 12A to, when injecting a packet into network 10 that is destined for router 12K, apply a label stack that includes node labels 6005, 3004, and 1001, and forward the network packet to router 12B.

As shown in FIG. 2D, the node segment for reaching the near-side PLR, i.e., 6005, includes a least significant digit of 5, which corresponds to the node identifier of NPLR 12F. The node segment ID for reaching the near-side PLR is therefore encoded with a node identifier of the near-side PLR as the destination. The node segment advertised by the near-side PLR, i.e., 3004, is encoded with the node identifier of the far-side PLR, i.e., FPLR 12J. Finally, the node segment advertised by the far-side PLR, i.e., 1001, is encoded with the node identifier of the destination for the packet that is destination router 12K.

Figure 2E:
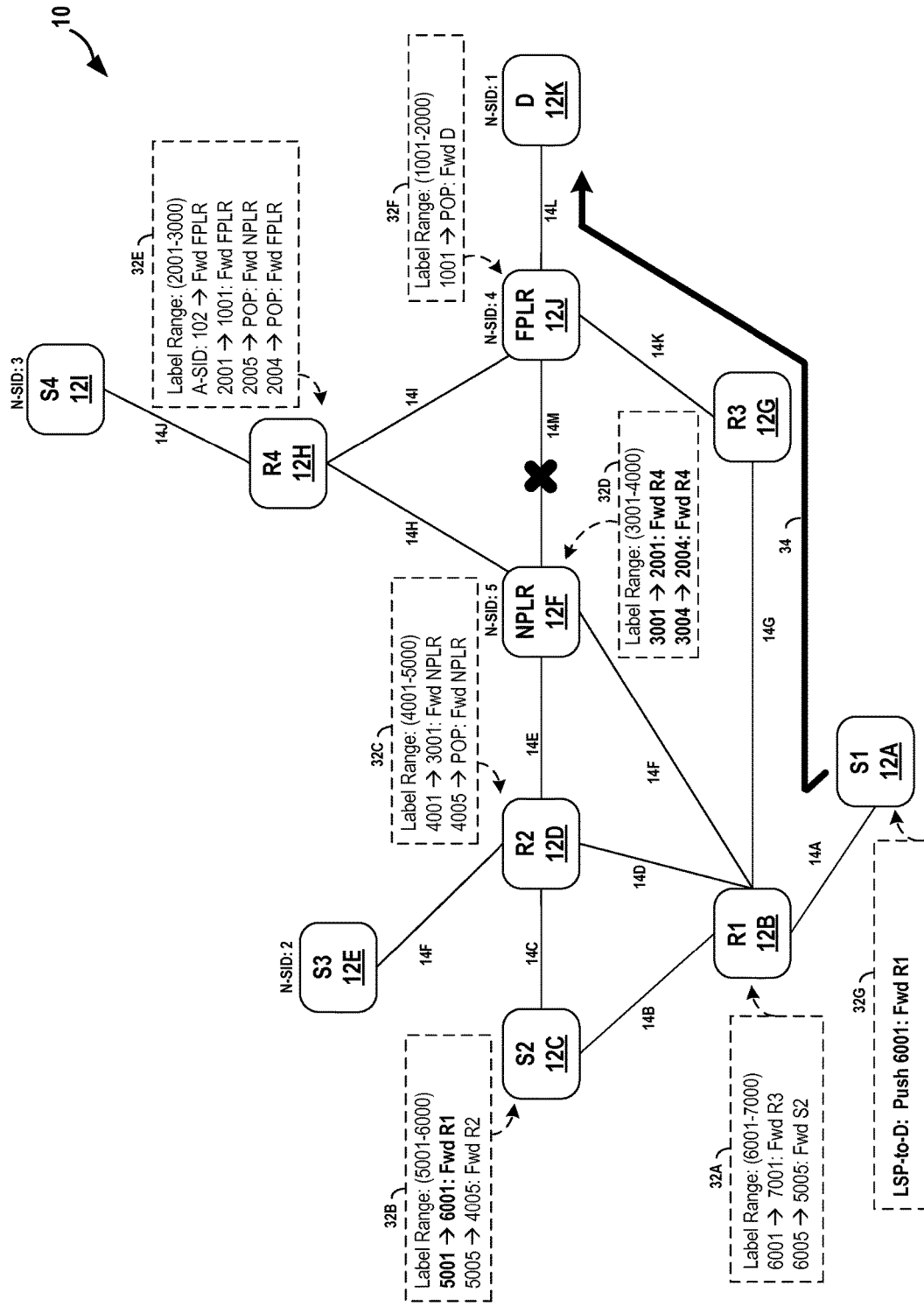

FIG. 2E illustrates the updated forwarding states of routers 12 after the expiration of timer T2 at NPLR router 12F and FPLR router 12J. Upon expiration of timer T2, NPLR router 12F updates all the corresponding node segments in its global segment block for FPLR 12J as per the new network topology. For instance, as shown in FIG. 2E, NPLR router 12F configures its forwarding state 32D to update entry 3001→102, 1001: Fwd R4 from FIG. 2D to 3001→2001: Fwd R4 in FIG. 2E. Accordingly, NPLR router 12F, when receiving a network packet with node label 3001, applies a node label 2001 corresponding to router 12H and forwards the network packet to router 12H. Similarly, as shown in FIG. 2E, NPLR router 12F configures its forwarding state 32D to update entry 3004→102: Fwd R4 from FIG. 2D to 3004→2004: Fwd R4. Thus, NPLR router 12F, when receiving a network packet with node label 3004, applies a node label 2004 corresponding to router 12H and forwards the network packet to router 12H. In other words, upon expiration of the defined time duration, NPLR router 12F forwards, according to the new network topology that is not based on applying the one or more adjacency labels that define the set of one-hop tunnels, network packets destined for the destination network device.

As further shown in FIG. 2E, source routers 12A, 12C, 12E, and 12I, forward network packets to destination 12K according to the new network topology. To illustrate, source router 12A configures its forwarding state 32G to update entry LSP-to-D: Push 6005, 3004, 1001: Fwd R1 in FIG. 2D to LSP-to-D: Push 6001: Fwd R1 in FIG. 2E. Accordingly, source router 12A, when injecting a network packet into network 10 that is destined for destination router 12K, applies a node label 6001 corresponding to router 12H and forwards the network packet to router 12B. Router 12B, which updated its forwarding information 12B in FIG. 2D to include the entry 6001→7001: Fwd R3, pushes label on the label stack of the network packet and forwards the network packet to router 12G. In other words, the network packet sent by source router 12A to destination router 12K traverses path 34 in the new network topology of FIG. 2E rather than sub-paths 30A, 30D and 30C in the original and temporary network topologies of FIGS. 2B-2D. In some examples, the nexthop for router 12K may not change at FPLR router 12J when link 14M goes down in FIG. 2E. In some examples, the techniques described in this disclosure with respect to NPLR router 12K may be similarly applied by one or more other routers of router 12 for destinations that get impacted due to link 14M going down.

Figure 3:
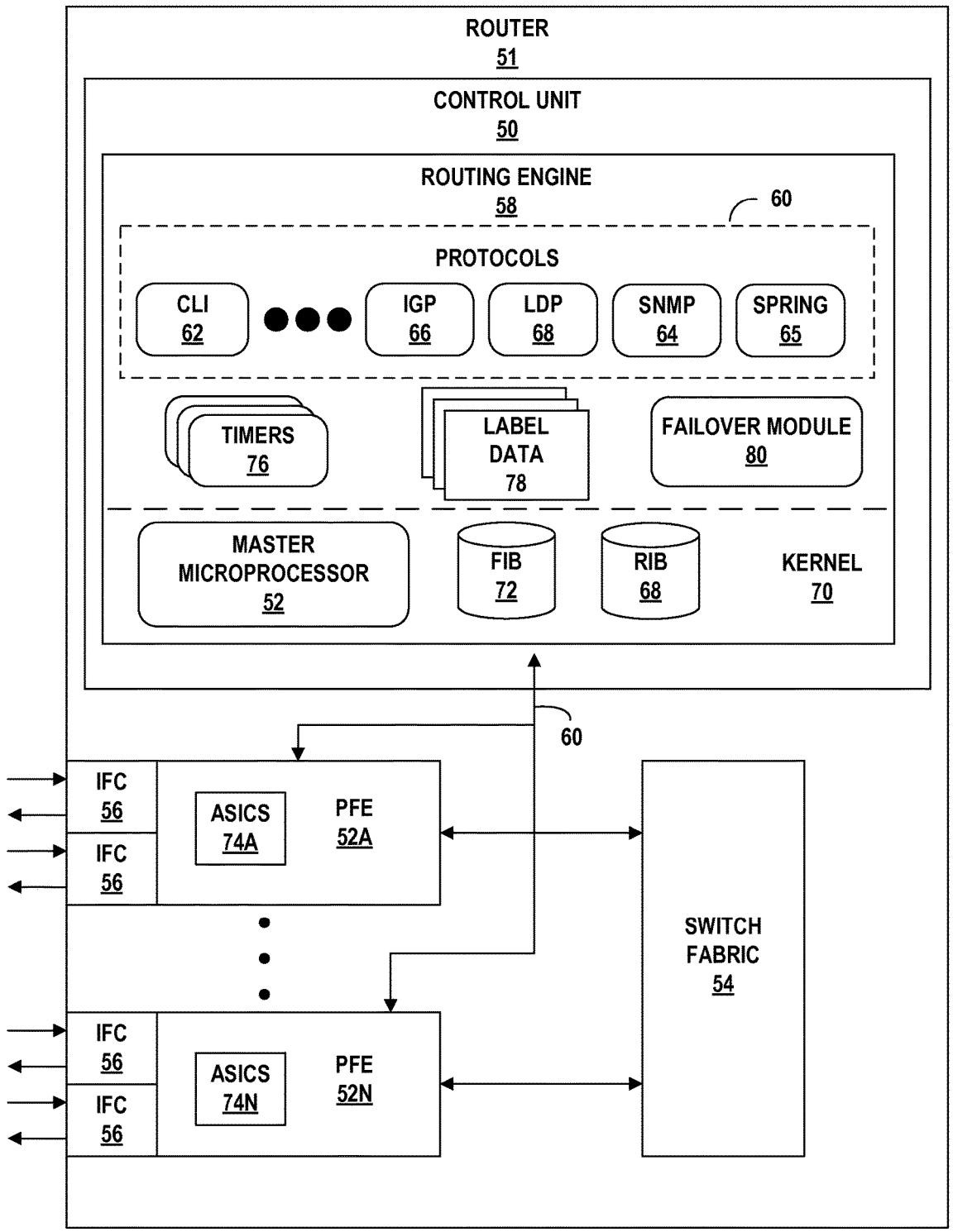
FIG. 3 is a block diagram illustrating an exemplary router capable of reducing or otherwise preventing micro-loops in an Internet Protocol (IP)/Multiprotocol Label Switching (MPLS) network using Source Packet Routing in Networking (SPRING), in accordance with techniques of this disclosure.

FIG. 3 is a block diagram illustrating an exemplary router capable of reducing or otherwise preventing micro-loops in an Internet Protocol (IP)/Multiprotocol Label Switching (MPLS) network using Source Packet Routing in Networking (SPRING), in accordance with techniques of this disclosure. Router 51 may comprise any router in a network, such as network 10. For example, router 51 may comprise a source router, a PLR router, a destination router, or any transit router illustrated in FIGS. 1-2. For purposes of illustration, router 51 is described as an NPLR router.

In the example of FIG. 3, router 51 includes control unit 50 in which routing engine 26 provides control plane functionality for router 51. Router 51 also includes a plurality of packet-forwarding engines 52A-52N ("PFEs 52") and a switch fabric 54 that collectively provide a data plane for forwarding network traffic. PFEs 52 receive and send data packets via interface cards 56 ("IFCs 56"). In other embodiments, each of PFEs 52 may comprise more or fewer IFCs. Although not shown, PFEs 52 may each comprise a central processing unit (CPU) and a memory. In this example, routing engine 58 is connected to each of PFEs 52 by a dedicated internal communication link 60. For example, dedicated link 60 may comprise a Gigabit Ethernet connection. Switch fabric 54 provides a high-speed interconnect for forwarding incoming data packets between PFEs 52 for transmission over a network. U.S. patent application Ser. No. 11/832,342, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. patent application Ser. No. 11/832,342 are incorporated herein by reference.

Routing engine 58 provides an operating environment for execution of various protocols 60 that may comprise software processes having instructions executed by a computing environment. As described in further detail below, protocols 60 provide control plane functions for storing network topology in the form of routing tables or other structures, executing routing protocols to communicate with peer routing devices and maintain and update the routing tables, and providing management interface(s) to allow user access and configuration of router 51. Control unit 50 provides an operating environment for routing engine 58 and may be implemented solely in software, or hardware, or may be implemented as a combination of software, hardware or firmware. For example, control unit 50 may include one or more processors which execute software instructions. In that case, routing engine 58 may include various software modules or daemons (e.g., one or more routing protocol processes, user interfaces and the like), and control unit 50 may include a computer-readable storage medium, such as computer memory or hard disk, for storing executable instructions.

Command line interface daemon 62 ("CLI 62") provides an interface by which an administrator or other management entity may modify the configuration of router 51 using text-based commands. Simple Network Management Protocol daemon 65 ("SNMP 65") comprises an SNMP agent that receives SNMP commands from a management entity to set and retrieve configuration and management information for router 51. Using CLI 62 and SNMP 65, management entities may enable/disable and configure services, install routes, enable/disable and configure rate limiters, and configure interfaces, for example.

One or more routing protocols, such as IGP 66, maintains routing information in the form of routing information base (RIB) 68 that describes a topology of a network, and derives a forwarding information base (FIB) 72 in accordance with the routing information. In general, the routing information represents the overall topology of the network. IGP 66 interacts with kernel 70 (e.g., by way of API calls) to update routing information base (RIB) 68 based on routing protocol messages received by router 51. RIB 68 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS—IS or OSPF). In contrast, FIB 72 is generated based on selection of certain routes within the network and maps packet key information (e.g., destination information and other select information from a packet header) to one or more specific next hops and ultimately to one or more specific output interface ports of IFCs 56. Routing engine 58 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

LDP 68 executes the Label Distribution Protocol to exchange MPLS labels for enabling label-based packet forwarding as described herein. In one example, LDP 68 operates in conformance with specifications set forth in in Andersson, L., et al, "LDP Specification", RFC 3036, January 2001, and/or Andersson, L., et al, "LDP Specification", RFC 5036, October 2007, the entire contents of each being incorporated herein by reference.

SPRING 65 executes the Source Packet Routing in Networking (SPRING) protocol. Using SPRING 65, router 51 forwards packets using node and adjacency labels as described with respect to FIGS. 1-2. In some examples, SPRING 65 implements the SPRING protocol in conformance with one or more of the following specifications, the entire contents of which are incorporated herein by reference:

(1) "SPRING Problem Statement and Requirements," IETF draft: draft-ietf-spring-problem-statement-01, Jun. 26, 2014

(2) "Segment Routing Architecture," IETF draft: draft-filsfils-spring-segment-routing-04, Jul. 3, 2014

(3) "Segment Routing with MPLS data plane," IETF draft: draft-filsfils-spring-segment-routing-mpls-03, Aug. 1, 2014

(4) "Segment Routing Use Cases," IETF draft: draft-filsfils-spring-segment-routing-use-cases-00, Mar. 27, 2014

(5) "IS-IS Extensions for Segment Routing," IETF draft: draft-ietf-isis-segment-routing-extensions-02, Jun. 18, 2014

(6) "OSPF Extensions for Segment Routing," IETF draft: draft-psenak-ospf-segment-routing-extensions-05, Jun. 5, 2014

(7) "OSPFv3 Extensions for Segment Routing," IETF draft: draft-psenak-ospf-segment-routing-ospfv3-extension-02, Jul. 2, 2014

(8) "BGP Link-State extensions for Segment Routing," IETF draft: draft-gredler-idr-bgp-ls-segment-routing-extension-00, Aug. 18, 2014

(9) "Segment Routing Egress Peer Engineering BGPLS Extensions," IETF draft: draft-previdi-idr-bgpls-segment-routing-epe-00, May 26, 2014

(10) "IPv6 Segment Routing Header (SRH)," IETF draft: draft-previdi-6man-segment-routing-header-02, Jul. 3, 2014.

Although techniques of the disclosure are described with respect to MPLS labels in some instances for example purposes, techniques of the disclosure may be similarly applied using IPv6 headers.

Routing engine 58 communicates data representative of a software copy of the FIB 72 into each of PFEs 52 to control forwarding of traffic within the data plane. This allows the software FIB stored in memory (e.g., RAM) in each of PFEs 52 to be updated without degrading packet-forwarding performance of router 51. In some instances, routing engine 58 may derive separate and different software FIBs for each respective PFEs 52. In addition, one or more of PFEs 52 include application-specific integrated circuits (ASICs 74) that PFEs 52 program with a hardware-copy of the FIB based on the software FIBs (i.e., hardware versions of the software FIBs) copied to each respective PFE 52.

For example, kernel 70 executes on master microprocessor 52 and may comprise, for example, a UNIX operating system derivative such as Linux or Berkeley Software Distribution (BSD). Kernel 70 processes kernel calls from IPG 66, LDP 68, and SPRING 65 to generate forwarding information in the form of FIB 72 based on the network topology represented in RIB 68, i.e., performs route resolution and path selection. Typically, kernel 70 generates FIB 72 in the form of radix or other lookup trees to map packet information (e.g., header information having destination information and/or a label stack) to next hops and ultimately to interface ports of interface cards associated with respective PFEs 52. FIB 72 may associate, for example, network destinations with specific next hops and corresponding IFCs 56. For MPLS-related traffic forwarding, FIB 72 stores label information that includes an incoming label, an outgoing label, and a next hop for a packet.

Master microprocessor 52 executing kernel 70 programs PFEs 52 to install copies of the FIB 72. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 74 are microcode-controlled chipsets (i.e., forwarding circuits) programmably configured by a slave microprocessor executing on each of PFEs 52. When forwarding packets, control logic with each ASIC 74 traverses the forwarding information (FIB 72) received from routing engine 58 and, upon reaching a FIB entry for the packet (e.g., a leaf node), microcode-implemented control logic 56 automatically selects a forwarding next hop and processes the packets in accordance with the operations defined within the next hop. In this way, ASICs 74 of PFEs 52 process packets by performing a series of operations on each packet over respective internal packet forwarding paths as the packets traverse the internal architecture of router 51. Operations may be performed, for example, on each packet based on any of a corresponding ingress interface, an ingress PFE 52, an egress PFE 52, an egress interface or other components of router 51 to which the packet is directed prior to egress, such as one or more service cards. PFEs 52 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 52 arranges forwarding structures as next hop data that can be chained together as a series of "hops" along an internal packet forwarding path for the network device. In many instances, the forwarding structures perform lookup operations within internal memory of ASICs 74, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 74 determines the manner in which a packet is forwarded or otherwise processed by PFEs 52 from its input interface on one of IFCs 56 to its output interface on one of IFCs 56.

In accordance with techniques of the disclosure, and with reference to the examples of FIGS. 1-2, router 51 may, at initial configuration and startup, advertise one or more adjacency labels that corresponds to adjacencies or network links/interfaces included in or coupled to router 51. Router 51 may also advertise one or more node labels and/or one or more node label ranges. The node label(s) and/or label range(s) may be uniquely associated with router 51 in the SR domain. Routing engine 58 may store information that represents the one or more node labels and adjacency labels as label data 78. Router 51 may also receive adjacency labels and node labels and/or node label ranges from other routers in the same SR domain. Label data 78 may also include information that represents the one or more node labels and adjacency labels received from other routers in the same SR domain. In some examples, router 51 may receive and set timer information that corresponds to MAX_FLOODING_DELAY and MAX_CONVERGENCE_DELAY.

As described above, routing engine 58 may use one or more protocols to determine routes through network 10 to, for example, destination router 12K. Routing engine 58 may configure FIB 72 to use a label stack of one or more labels of label data 78 as the next hop for forwarding network packets to destination router 12K. In some examples, forwarding state 32A of FIG. 2 may be included in FIB 72, which routing engine 58 programs or otherwise uses to configure ASICS 74 of PFEs 52. In this way, when ASICS 74 performs a lookup on a network packet destined for destination router 12K, ASICS 74 may apply one or more labels to the network packet and forward it to the appropriate next hop router using the appropriate one of interfaces 56.

Routing engine 58 may include a failover module (FM) 80 that implements techniques of this disclosure to prevent or reduce micro-loops. Although shown as a part of routing engine 58, in some examples, FM 80 may be included in one or more of PFEs 52. In some examples, functionality of FM 80 may be divided or otherwise split across PFEs 52 and routing engine 58. FM 80 may be implemented as software, hardware, or a combination of software and hardware.

Initially, router 51 may forward network traffic destined for router 12K using communication link 14M, as described in FIGS. 1-2. However, communication link 14M may fail at a later time. PFE 52A may initially determine that one of IFCs 56 coupled to communication link 14M is unable to transmit data. PFE 52A may send information via communication link 60 to routing engine 58 indicating the link failure. Failover module 80, upon determining a link failure has occurred, causes one or more of PFEs 52 to flood link state advertisements to the other routers of network 10 that indicates that the link failure has occurred.

Failover module (FM) 80, in response to determining that communication link 14M has failed, may determine a backup sub-path 30D as illustrated in FIGS. 2B-2E. As described in FIGS. 2A-2E, backup sub-path 30 may circumvent failed communication link 14M. Whether backup sub-path 30 is determined responsive to the failure of communication link 14M or pre-computed at initial configuration and startup, failover module 80 may use protocols 60 to determine one or more next hop routers along backup sub-path 30. In accordance with techniques of the disclosure, failover module 80 may construct a list of one or more adjacency labels that correspond to each of the links on backup sub-path 30D computed by router 51. In other words, router 51 constructs a segment list using adjacency segments for each of the links on the new path computed. Kernel 70 may receive the list of one or more adjacency labels, which kernel 70 uses to re-configure FIB 72. As described above, master microprocessor 52 executing kernel 70 may install copies of the updated FIB 72 into one or more of PFEs 52.

To further illustrate with reference to the example of FIG. 2B-2D, ASIC 74A, for example, upon receiving a network packet destined for router 12K, pushes a label stack onto a packet destined for destination router 12K that includes the adjacency label 102 in addition to the node label of FPLR router 12J that would otherwise be applied prior to the failure of communication link 14M. Accordingly, FIB 72 includes information 3001→102, 1001: Fwd R4 that causes ASIC 74A (or another one of ASICs 74 if the packet is internally forwarded on switch fabric 54), upon receiving a packet destined to router 12K, to apply a label stack that includes adjacency label 102 and node label 1001, and forwards the packet to router 12H (e.g., "R4") based on the interface that corresponds to router 12H as indicated in FIB 72. Consequently, if ASIC 74A receives a packet with the node segment for FPLR router 12J, ASIC 74A will forward the packet using backup sub-path 30D and avoid failed communication link 14M.

In accordance with techniques of the disclosure, FM 80 sets a timer T1 in timers 76 equal to a duration or interval of MAX_FLOODING_DELAY responsive to detecting the link failure. Router 51 may flood link-state advertisements until timer T1 expires. FM 80 may also, responsive to detecting the link failure, start a timer T1 in timers 76 with a duration or interval equivalent to:

2*MAX_CONVERGENCE_DELAY+
MAX_FOODING_DELAY

As further described below, router 51 may, upon expiration of T1, update its forwarding decisions.

As described in FIGS. 2A-2E, each non-PLR router of routers 12 (e.g., excluding NPLR router 51 and FPLR router), upon receiving a link-state advertisement (e.g., using IGP) that indicates the failure of communication link 14M, start a timer T3 with an interval that is equivalent to the maximum convergence delay (MAX_CONVERGENCE_DELAY). Each non-PLR router of routers refrains from converging onto the new network topology until the expiration of timer T3.

Upon receiving a link-state advertisement that indicates the failure of communication link 14M, each of the source routers may determine destinations that are affected by the failure of communication link 14M, such as destination router 12K. For instance, source router 12A determines that path 30 to destination router 12K has been affected by the failure of communication link 14M. Responsive to this determination, source router 12A computes a label stack with a first node label that corresponds to router 12B along path 30 and a second node label that corresponds to NPLR router 12F. Each source router configures its forwarding state to apply its respective label stack to each network packet injected into network 10 that is destined for destination router 12K. At the expiration of timer T3, all of the non-PLR routers converge onto the new network topology.

Upon expiration of timer T2 in timers 76, NPLR router 12F updates the forwarding state of all the corresponding node segments in its global segment block for the remote PLR as per the new forwarding topology. For instance, kernel 70 may receive information from failover module 80 to configure FIB 72 to update entry 3001→102, 1001: Fwd R4 from FIG. 2D to 3001→2001: Fwd R4 in FIG. 2E. Master microprocessor 52 using kernel 70 may configure one or more of ASICs 74 with the updated FIB 72. Accordingly, ASICs 74, when receiving a network packet with node label 3001, applies a node label 2001 corresponding to router 12H and forwards the network packet to router 12H using the interface indicated by FIB 72. Similarly, as shown in FIG. 2E, kernel 70 receives information from FM 80 to update entry 3004→102: Fwd R4 from FIG. 2D to 3004→2004: Fwd R4 in FIB 72. Master microprocessor 52 using kernel 70 updates ASICs 74 accordingly. In this way, ASICs 74, when receiving a network packet with node label 3004, applies a node label 2004 corresponding to router 12H and forwards the network packet to router 12H using the interface indicated by FIB 72. Thus, after router 12F updates and converges the node segment of FPLR 12J as per new the topology that does not include communication link 14M, NPLR 12F uses node labels, rather than the previously used adjacency labels, to forward network to destination router 12K.

As described in FIG. 2, upon expiration of timers T2 at source routers 12A, 12C, 12E, and 12I, each of the source routers updates its respective forwarding information to forward network packets to destination 12K according to the new network topology. To illustrate, source router 12A configures its forwarding state 32G to update entry LSP-to-D: Push 6005, 3004, 1001: Fwd R1 in FIG. 2D to LSP-to-D: Push 6001: Fwd R1. Accordingly, source router 12A, when injecting a network packet into network 10 that is destined for destination router 12K, applies a node label 6001 corresponding to router 12H and forwards the network packet to router 12B. Router 12B, which updated its forwarding information 12B in FIG. 2D to include the entry 6001→7001: Fwd R3, pushes label on the label stack of the network packet and forwards the network packet to router 12G. In other words, the network packet sent by source router 12A to destination router 12K traverses path 34 in FIG. 2E rather than sub-paths 30A, 30D and 30C in original and temporary network topologies of FIGS. 2B-2E.

The architecture of router 51 illustrated in FIG. 3 is shown for exemplary purposes only. This disclosure is not limited to this architecture. In other examples, router 51 may be configured in a variety of ways. In one example, some of the functionally of control unit 50 may be distributed within IFCs 56. Control unit 82 may be implemented solely in software, or hardware, or may be implemented as a combination of software, hardware, or firmware. For example, control unit 50 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 50 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 4:
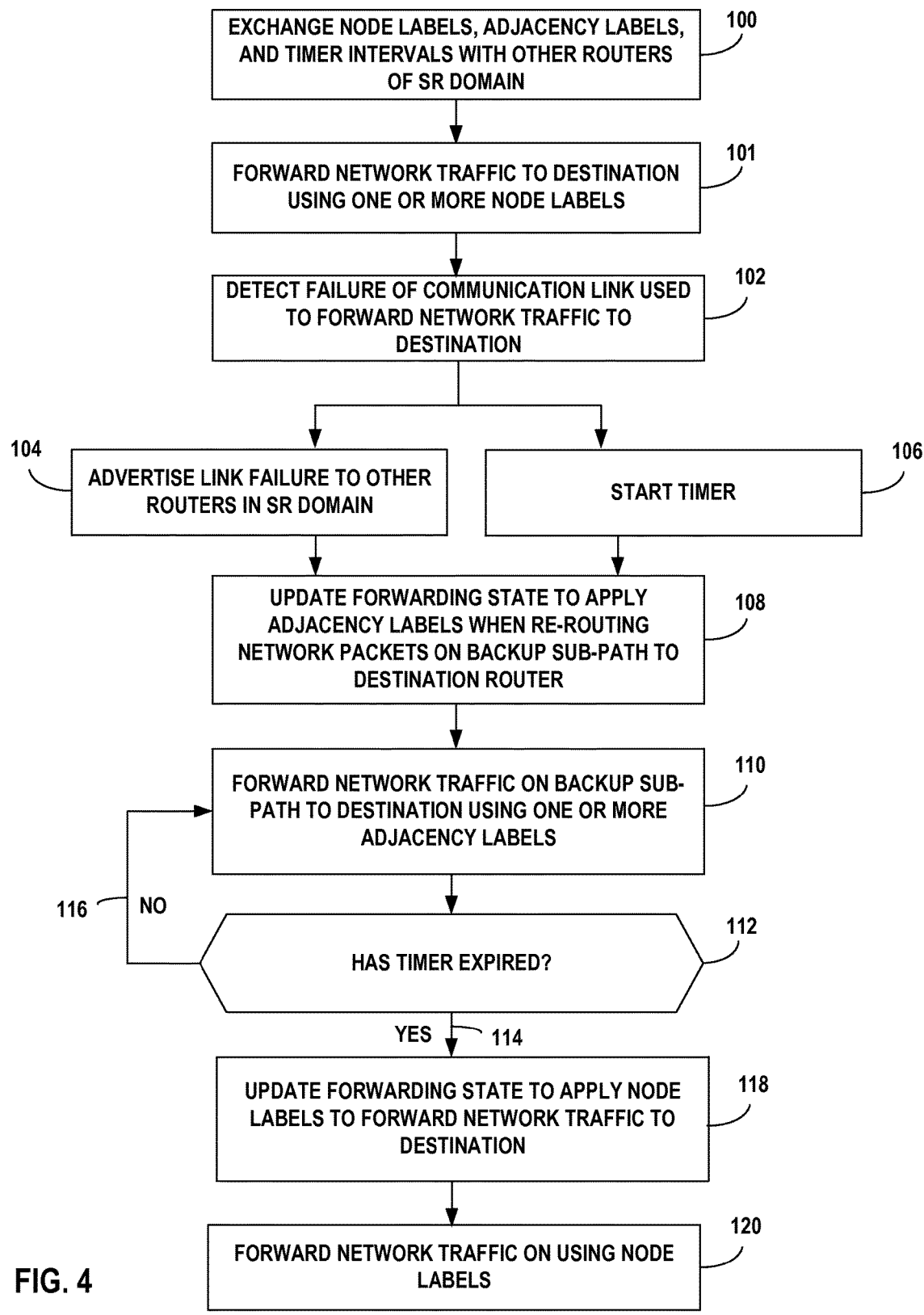
FIG. 4 is a flowchart that illustrates example operations of a router of FIG. 1 that implements techniques for reducing or otherwise preventing micro-loops in an Internet Protocol (IP)/Multiprotocol Label Switching (MPLS) network using Source Packet Routing in Networking (SPRING), in accordance with techniques of this disclosure.

FIG. 4 is a flowchart that illustrates example operations of a router of FIG. 1 that implements techniques for reducing or otherwise preventing micro-loops in an Internet Protocol (IP)/Multiprotocol Label Switching (MPLS) network using Source Packet Routing in Networking (SPRING), in accordance with techniques of this disclosure. For purposes of illustration only, the example operations are described below within the context of router 12F and router 51, as shown in FIGS. 1-3. In some examples, FM module 80 of FIG. 3 may perform one or more of the techniques of FIG. 4.

Router 12F, which may be a PLR router, may initially exchange node labels, adjacency labels, and timer intervals as described in FIGS. 1-3 (100). In particular, router 12F may advertise a node label range that is uniquely associated with router 12F. Router 12F may also advertise one or more adjacency labels that correspond to communication links directly coupled to router 12F. In addition, router 12F may receive timer intervals corresponding to MAX_FLOODING_DELAY and MAX_CONVERGENCE_DELAY advertised by another router in the SR domain and store this information for later use. Alternatively, router 12F may determine MAX_FLOODING_DELAY and MAX_CONVERGENCE_DELAY as previously stored values and advertise the values to the other routers in the SR domain.

Router 12F may configure its forwarding state to forward network packets using node labels as described in FIGS. 1-3 (101). For instance, router 12F may determine one or more routes through network 10 to destination router 12K. Router 12F may configure its forwarding state to forward network packets destined for destination router 12K using node labels as described in FIGS. 1-3. At a later time, router 12F may detect a link failure at communication link 14M (102). Responsive to detecting the link failure, router 12F may advertise the link failure to other routers in the SR domain (104). For instance, router 12F may send link state advertisements that indicate the link that has failed. In response to detecting the link failure, router 12F may also start a timer (106) with an interval that is equal to:

MAX_FLOODING_DELAY+2*MAX_CONVERGENCE_DELAY

In accordance with techniques of the disclosure, responsive to detecting the link failure, router 12F may also determine a backup sub-path from router 12F (an NPLR router) to the FPLR router (e.g., FPLR router 12J) that circumvents the failed link. Router 12F may determine a list of adjacency labels for each link of the backup path from router 12F to router 12J. Based on determining the backup sub-path, router 12F may update its forwarding state to apply the list of adjacency labels as a label stack to each network packet destined to destination router 12K (108).

Upon configuring its forwarding state, router 12F may forward any network packets destined for destination router 12K using the list of adjacency labels (110). By applying the list of adjacency labels rather than node labels, techniques of the disclosure implemented by router 12F may prevent or reduce micro-loops. While router 12F is forwarding network packets to destination router 12K using adjacency labels, the other routers of network 10 (excluding FPLR router 12J) update their respective forwarding states based on the failure of communication link 14M; however, the other routers do not converge onto a new network topology that does not include communication link 14M until an interval of MAX_CONVERGENCE_DELAY has passed. By waiting until an interval of MAX_CONVERGENCE_DELAY has passed until the non-PLR routers converge, techniques of the disclosure may prevent or reduce micro-loops in the event of link failure.

Router 12F may determine whether its timer (with an interval of MAX_FLOODING_DELAY+2*MAX_CONVERGENCE_DELAY) has expired (112). If the timer has not expired (116), router 12F continues to forward network packets to destination router 12K using the list of adjacency labels as described above (110). If, however, the timer at router 12F has expired, router 12F may update its forwarding state to apply node labels according to the new network topology that does not include the failed communication link (118). In other words, router 12F may not use the list of adjacency labels that correspond to the backup sub-path to forward network packets to destination router 12J after the timer has expired. In some examples, router 12F may apply one or more node labels that correspond to one or more next hop routers to forward network packets to destination router 12K. In some examples, the one or more next hop routers are the routers in the backup sub-path, which are now used as the primary path for network packets forwarded by router 12F and destined for destination router 12K.

Figure 5:
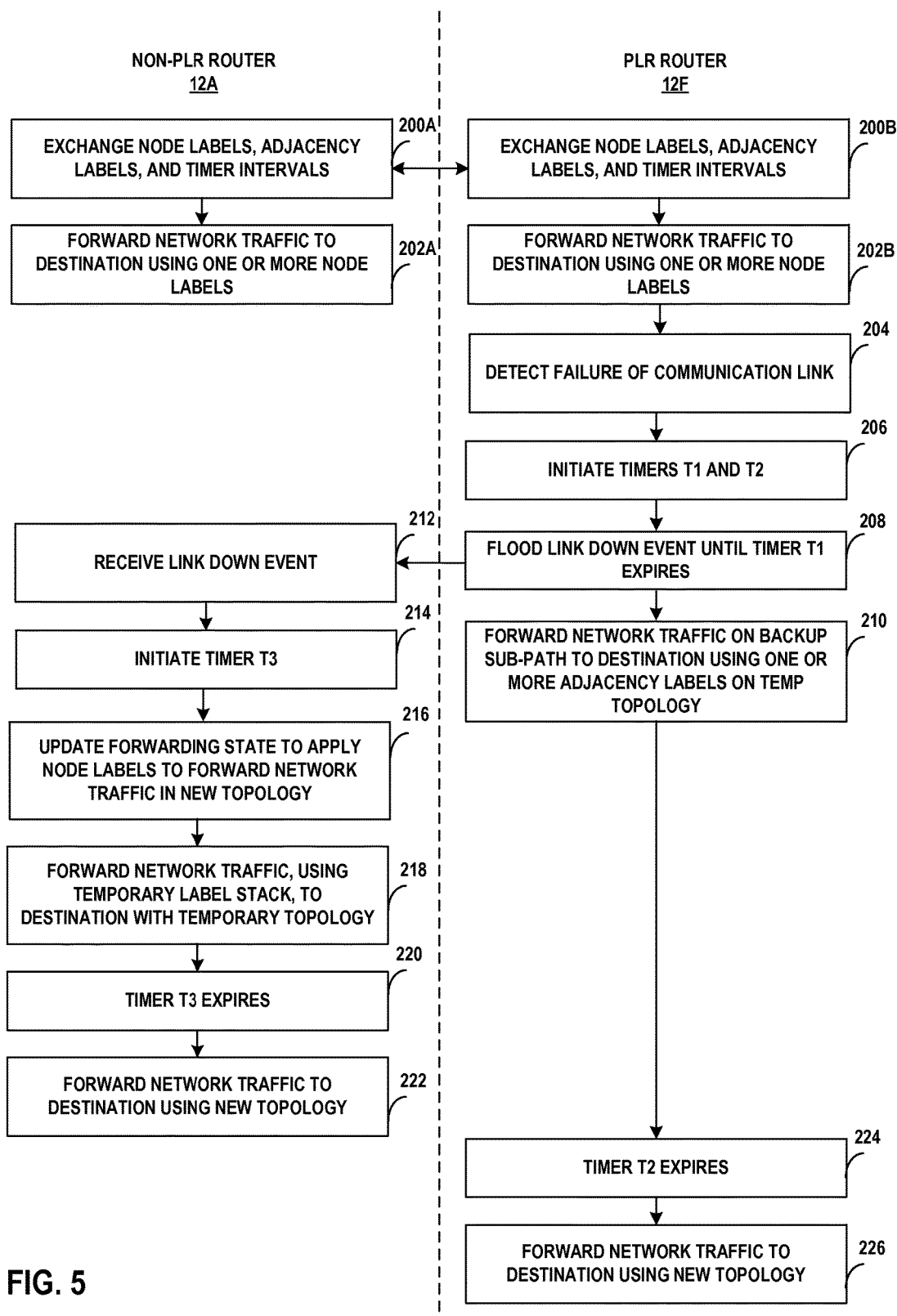
FIG. 5 is a flowchart that illustrates example operations of a non-PLR router and a PLR router of FIGS. 1-3, that implement techniques for reducing or otherwise preventing micro-loops in an Internet Protocol (IP)/Multiprotocol Label Switching (MPLS) network using Source Packet Routing in Networking (SPRING), in accordance with techniques of this disclosure.

FIG. 5 is a flowchart that illustrates example operations of a non-PLR router and a PLR router of FIGS. 1-4, that implement techniques for reducing or otherwise preventing micro-loops in an Internet Protocol (IP)/Multiprotocol Label Switching (MPLS) network using Source Packet Routing in Networking (SPRING), in accordance with techniques of this disclosure. For example purposes only, the techniques of FIG. 5 are described with respect to NPLR router 12F (e.g., PLR router) and source router 12A (e.g., non-PLR router). Router 12F and non-PLR router 12A may initially exchange node labels, adjacency labels, and timer intervals as described in FIGS. 1-4 (200). In particular, router 12F may advertise a node label range that is uniquely associated with router 12F. Router 12F may also advertise one or more adjacency labels that correspond to communication links directly coupled to router 12F. In addition, router 12F may receive timer intervals corresponding to MAX_FLOODING_DELAY and MAX_CONVERGENCE_DELAY advertised by another router in the SR domain and store this information for later use. Alternatively, router 12F may determine MAX_FLOODING_DELAY and MAX_CONVERGENCE_DELAY as previously stored values and advertise the values to the other routers in the SR domain. Non-PLR router 12A may perform similar action as described with respect to PLR router 12F.

Router 12F and non-PLR router 12A may each configure its respective forwarding state to forward network packets using node labels as described in FIGS. 1-4 (202). For instance, each of router 12F router non-PLR router 12A may determine one or more routes through network 10 to destination router 12K. Router 12F and router 12A may each configure its forwarding state to forward network packets destined for destination router 12K using node labels as described in FIGS. 1-4. A At a later time, router 12F may detect a link failure at communication link 14M (204). Responsive to detecting the link failure, router 12F may initiate timers T1 and T2 as described in FIGS. 2-4 (206). Timer T1 may have a duration of MAX_FLOODING_DELAY and timer T2 may have a duration of MAX_FLOODING_DELAY+2*MAX_CONVERGENCE_DELAY. Router 12F may advertise the link failure to other routers in the SR domain until T1 expires, e.g., for a duration of MAX_FLOODING_DELAY (208). For instance, router 12F may send link state advertisements that indicate the link that has failed.

Responsive to detecting the link failure, router 12F may also determine a backup sub-path from router 12F (an NPLR router) to the FPLR router (e.g., FPLR router 12J) that circumvents the failed link. Router 12F may determine a list of adjacency labels for each link of the backup path from router 12F to router 12J. Based on determining the backup sub-path, router 12F may update its forwarding state to apply the list of adjacency labels as a label stack to each network packet destined to destination router 12K. Upon configuring its forwarding state, router 12F may forward any network packets destined for destination router 12K using the list of adjacency labels (210). By applying the list of adjacency labels rather than node labels, techniques of the disclosure implemented by router 12F may prevent or reduce micro-loops.

Router 12A, may receive a link-state advertisement that indicates the failed link, as router 12F is flooding the link down event (212). Responsive to receiving the link-state advertisement, router 12A initiates a timer T3 that is equal to MAX_CONVERGENCE_DELAY (214). Router 12A updates its forwarding state based on the failure of communication link 14M to apply node labels for a new network topology that does not include the failed link (216). However, router 12A does not converge onto the new network topology until timer T3 has expired. In other words, router 12A continues to forward network traffic to destination router 12K using a temporary network topology that includes the backup sub-path with adjacency labels applied by router 12F (218). Specifically, router 12A may, as described in FIG. 2, apply a node label stack that includes (1) a first node label that corresponds to NPLR router 12F; and (2) a second node label that corresponds to a next hop router on a path to reach NPLR router 12F. By waiting until an interval of MAX_CONVERGENCE_DELAY has passed until router 12A converges, techniques of the disclosure may prevent or reduce micro-loops in the event of link failure.

Router 12A subsequently determines that timer T3 has expired, i.e., a duration of MAX_CONVERGENCE_DELAY has occurred (220). Upon expiration of timer T3, router 12A begins forwarding traffic using the new topology that does not include the failed communication link (222). In other words, although router 12A previously updated its forwarding state to forward network packets using node labels for the new topology, router 12A does not converge until the expiration of timer T3. By waiting until an interval of MAX_CONVERGENCE_DELAY has passed until the non-PLR routers converge, techniques of the disclosure may prevent or reduce micro-loops in the event of link failure.

Router 12F, continues to forward network traffic along the backup sub-path using the list of adjacency labels until the expiration of timer T2 (224). Upon determining that timer T2 has expired, router 12F converges to the new network topology and begins forwarding network packets to destination router 12K using node labels rather than the adjacency labels used for the temporary network topology (226).

Techniques of the present disclosure using SPRING to avoid or otherwise prevent micro-loops may provide certain advantages over using other techniques such as T-LDP. For instance, using T-LDP for micro-loop free convergence may have certain disadvantages. As an example, if a router procures T-LDP labels on ad-hoc basis (i.e. on receiving the IGP link-state event from an NPLR), it will need to first setup T-LDP sessions with the NPLR, and then procure the desired labels. As T-LDP sessions formation and learning labels may need some time, the traffic may be sent on an older forwarding path for so long as still susceptible to transient micro-loops. To illustrate another disadvantage with T-LDP, if a router decides to procure T-LDP labels in advance, it will essentially have to setup T-LDP sessions to each node in the network (considering any link in the network can go down at any point of time) and learn labels for all possible destination nodes. This approach can pose some scalability overheads as compared to SPRING (e.g. in real practical deployments the maximum number of incoming T-LDP sessions a single node can handle may be in the order of few hundreds).

As described above, implementing nearside tunneling mechanism using T-LDP (targeted LDP) to ensure loop-free convergence may bear some convergence and scalability issues. For instance, while setting up targeted-LDP session to an NPLR and learning T-LDP labels on demand (i.e after learning link-down event from NPLR) may elongate the duration of traffic loss (and possibly also cause micro loops). On the other, if T-LDP labels are to be learnt from each router for each of its link and each of the destination affected by the link before the failure event it will amount to each source initiating as many T-LDP sessions as the total number of routers in the network, which may pose scalability issues introduced by T-LDP depending on the number of nodes in the network.

Accordingly, techniques of the disclosure use of SPRING segments distributed by link-state IGP protocols (e.g. OSPF and ISIS) as tunnel segments to prevent micro-loops. Since the tunnels required to setup by near-side PLR are available before-hand, the global convergence may be faster compared to other tunneling mechanisms. In some examples, each router may exchange all of its adjacency and node labels/label ranges at initial configuration and startup when the router becomes a part of the network. Accordingly, in some examples each router can determine all tunnels based on the node and adjacency labels for paths in the network. Therefore, in some examples, techniques of the disclosure allow the routers implementing SPRING to determine backup paths before a link failure occurs. Moreover, such techniques may not be subject to the scalability limitations of T-LDP as the total number of routers grows. Furthermore, there may be no additional overhead of setting up tunnels before-hand (as is the case with targeted LDP sessions) because SPRING provides ready-made tunnels.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of the invention have been described. These and other embodiments are within the scope of the following claims.

What is claimed is:

1. A method comprising:
   detecting, by a near-side point of local failure (NPLR), a failure of a communication link that couples the NPLR and a far-side point of local failure (FPLR), wherein the NPLR and the FPLR are each network devices that implement a Source Packet Routing in Networking (SPRING) protocol to forward network packets using node labels according to an initial network topology of a network that comprises a plurality of other network devices, wherein the NPLR, the FPLR, and any of the other network devices operating in accordance with the SPRING protocol exchange the node labels using at least one link-state interior gateway protocol (IGP);
   responsive to detecting the failure of the communication link, applying, by the NPLR and for a defined time duration, one or more adjacency labels in accordance with the SPRING protocol to network packets destined for a destination network device, wherein the one or more adjacency labels define a set of one-hop tunnels corresponding to a backup sub-path that circumvents the failed communication link;
   forwarding, by the NPLR and according to a temporary network topology that is based on the set of one-hop tunnels that provide the backup sub-path, the network packets; and
   upon expiration of the defined time duration, forwarding, by the NPLR and according to a new network topology that is not based on applying the one or more adjacency labels that define the set of one-hop tunnels, network packets destined for the destination network device.

2. The method of claim 1, further comprising:
   before detecting, by the NPLR, the failure of the communication link:
      receiving, by the NPLR, the one or more adjacency labels from one or more of the plurality of other network devices;
      pre-computing, by the NPLR, the backup sub-path that does not include the communication link; and
   after detecting, by the NPLR, the failure of the communication link:
      configuring, by the NPLR and based on the pre-computing of the backup sub-path, a forwarding state of the NPLR to apply the one or more adjacency labels to network packets destined for the destination network device.

3. The method of claim 1, wherein the defined time duration is a first defined time duration, the method further comprising:
   responsive to detecting the failure of the communication link:
      initiating, by the NPLR, a first timer with the first defined time duration;
      initiating, by the NPLR, a second timer with a second time duration; and
      sending, by the NPLR and while the second timer has not expired, a plurality of link state advertisements to the plurality of other network devices.

4. The method of claim 1, further comprising:
   before detecting, by the NPLR, the failure of the communication link:
      receiving, by the NPLR, at least one node label or range of node labels from one of the plurality of other network devices, wherein the at least one node label or range of node labels uniquely identifies the one of the plurality of other network devices in a segment routing domain that includes the NPLR, FPLR and the plurality of other network devices; and
      configuring, by the NPLR, a forwarding state of the NPLR to apply the at least one node label or range of node labels that uniquely identifies the one of the plurality of other network devices to network packets destined for the destination network device.

5. The method of claim 1, wherein forwarding, according to the new network topology that is not based on applying the one or more adjacency labels that define the set of one-hop tunnels, network packets destined for the destination network device, further comprises:
applying, by the NPLR, at least one node label or range of node labels that uniquely identifies one of the plurality of other network devices to network packets destined for the destination network device, wherein the one of the plurality of other network devices was included in the backup sub-path.

6. The method of claim 1, wherein the backup sub-path comprises a portion of an overall network path through the network between a source network device and a destination network device.

7. The method of claim 1, further comprising:
receiving, by one of the plurality of other network devices that is not the NPLR or the FPLR, a link state advertisement that the communication link has failed;
responsive to receiving the link state advertisement, initiating, by the one of the plurality of other network devices that is not the NPLR or the FPLR, a timer;
configuring, before the timer has expired, a forwarding state of the one of the plurality of other network devices that is not the NPLR or the FPLR, to forward network packets according to the new network topology; and
forwarding, while the timer has not expired and by the one of the plurality of other network devices that is not the NPLR or the FPLR, network packets destined for the destination network device according to the temporary network topology.

8. The method of claim 7, wherein forwarding, while the timer has not expired, network packets destined for the destination network device according to the temporary network topology further comprises:
responsive to determining the network packets are destined for the destination network device, applying, by the one of the plurality of other network devices that is not the NPLR or the FPLR, a label stack to each of the network packets, wherein the label stack comprises:
a first node label that corresponds to a next hop router on a path to reach the NPLR; and
a second node label that corresponds to destination.

9. The method of claim 7, further comprising:
responsive to the expiration of the timer, forwarding, by the one of the plurality of other network devices that is not the NPLR or the FPLR, network packets destined for the destination network device according to the new network topology.

10. The method of claim 9, wherein forwarding network packets destined for the destination network device according to the new network topology further comprises:
applying to a first network packet destined for the destination network device, by the one of the plurality of other network devices that is not the NPLR or the FPLR, a first node label that is different than a second node label, wherein the second node label was applied to a second network packet based on the original network topology, wherein the second network packet was destined for the destination network device.

11. A network device, wherein the network device is a first point of local failure (PLR), the network device comprising:
at least one processor;
at least one module operable by the at least one processor to:
detect a failure of a communication link that couples the first PLR and a second PLR, wherein the first PLR and the second PLR are each network devices that implement a Source Packet Routing in Networking (SPRING) protocol to forward network packets using node labels according to an initial network topology of a network that comprises a plurality of other network devices, wherein the first PLR, the second PLR, and any of the other network devices operating in accordance with the SPRING protocol exchange the node labels using at least one link-state interior gateway protocol (IGP);
responsive to detecting the failure of the communication link, apply, for a defined time duration, one or more adjacency labels in accordance with the SPRING protocol to network packets destined for a destination network device, wherein the one or more adjacency labels define a set of one-hop tunnels corresponding to a backup sub-path that circumvents the failed communication link;
forward, according to a temporary network topology that is based on the set of one-hop tunnels that provide the backup sub-path, the network packets; and
upon expiration of the defined time duration, forward, according to a new network topology that is not based on applying the one or more adjacency labels that define the set of one-hop tunnels, network packets destined for the destination network device.

12. The network device of claim 11, wherein the at least one module is operable by the at least one processor to:
before detecting the failure of the communication link:
receive the one or more adjacency labels from one or more of the plurality of other network devices;
pre-compute the backup sub-path that does not include the communication link; and
after detecting the failure of the communication link:
configure, based on the pre-computing of the backup sub-path, a forwarding state of the first PLR to apply the one or more adjacency labels to network packets destined for the destination network device.

13. The network device of claim 11, wherein the at least one module is operable by the at least one processor to:
responsive to detecting the failure of the communication link:
initiate a first timer with the first defined time duration;
initiate a second timer with a second time duration; and
send, while the second timer has not expired, a plurality of link state advertisements to the plurality of other network devices.

14. The network device of claim 11, wherein the at least one module is operable by the at least one processor to:
before detecting the failure of the communication link:
receive at least one node label or range of node labels from one of the plurality of other network devices, wherein the at least one node label or range of node labels uniquely identifies the one of the plurality of other network devices in a segment routing domain that includes the first PLR, the second PLR and the plurality of other network devices; and
configure a forwarding state of the first PLR to apply the at least one node label or range of node labels that uniquely identifies the one of the plurality of other network devices to network packets destined for the destination network device.

15. The network device of claim 11, wherein the at least one module is operable by the at least one processor to:
apply at least one node label or range of node labels that uniquely identifies one of the plurality of other network devices to network packets destined for the destination network device, wherein the one of the plurality of other network devices was included in the backup sub-path.

16. The network device of claim 11, wherein the backup sub-path comprises a portion of an overall network path through the network between a source network device and a destination network device.

17. A method comprising:
receiving, by a non-point of local failure (non-PLR) network device of a plurality of network devices in a segment routing domain, a link state advertisement that a communication link has failed between a near-side point of local failure (NPLR) and a far-side point of local failure (FPLR) that are each included in the segment routing domain, wherein the non-PLR, NPLR and the FPLR are each network devices that implement a Source Packet Routing in Networking (SPRING) protocol to forward network packets using node labels according to an initial network topology of a network that includes the plurality of network devices, wherein the non-PLR, the NPLR, the FPLR, and any of the other network devices operating in accordance with the SPRING protocol exchange the node labels using at least one link-state interior gateway protocol (IGP);
responsive to receiving the link state advertisement, initiating, by the non-PLR network device, a timer;
configuring, before the timer has expired, a forwarding state of the non-PLR network device, to forward network packets according to a new network topology; and
forwarding, while the timer has not expired and by the non-PLR network device, network packets destined for a destination network device according to a temporary network topology that is different than the new network topology, wherein the temporary network topology is based on one or more adjacency labels in accordance with the SPRING protocol that define a set of one-hop tunnels corresponding to a backup sub-path that circumvents the failed communication link between the NPLR and the FPLR.

18. The method of claim 17, wherein forwarding, while the timer has not expired, network packets destined for the destination network device according to the temporary network topology further comprises:
responsive to determining the network packets are destined for the destination network device, applying, by the non-PLR network device, a label stack to each of the network packets, wherein the label stack comprises:
a first node label that corresponds to a next hop router on a path to reach the NPLR; and
a second node label that corresponds to the destination network device.

19. The method of claim 17, further comprising:
responsive to the expiration of the timer, forwarding, by the non-PLR network device, network packets destined for the destination network device according to the new network topology.

20. A method comprising:
receiving, by a non-point of local failure (non-PLR) network device of a plurality of network devices in a segment routing domain, a link state advertisement that a communication link has failed between a near-side point of local failure (NPLR) and a far-side point of local failure (FPLR) that are each included in the segment routing domain, wherein the non-PLR, the NPLR and the FPLR are each network devices that implement a Source Packet Routing in Networking (SPRING) protocol to forward network packets using node labels according to an initial network topology of a network that includes the plurality of network devices, wherein the non-PLR, the NPLR, the FPLR, and any of the other network devices operating in accordance with the SPRING protocol exchange the node labels using at least one link-state interior gateway protocol (IGP);
responsive to receiving the link state advertisement, initiating, by the non-PLR network device, a timer;
configuring, before the timer has expired, a forwarding state of the non-PLR network device, to forward network packets according to a new network topology;
forwarding, while the timer has not expired and by the non-PLR network device, network packets destined for a destination network device according to a temporary network topology that is different than the new network topology, wherein the temporary network topology is based on one or more adjacency labels in accordance with the SPRING protocol that define a set of one-hop tunnels corresponding to a backup sub-path that circumvents the failed communication link between the NPLR and the FPLR; and
responsive to the expiration of the timer, forwarding, by the non-PLR network device, network packets destined for the destination network device according to the new network topology, wherein forwarding network packets destined for the destination network device according to the new network topology further comprises:
applying to a first network packet destined for the destination network device, by the non-PLR network device, a first node label that is different than a second node label, wherein the second node label was applied to a second network packet based on the original network topology, wherein the second network packet was destined for the destination network device.

* * * * *